United States Patent
Yoganandan et al.

(10) Patent No.: US 10,646,022 B2
(45) Date of Patent: May 12, 2020

(54) SYSTEM AND METHOD FOR OBJECT MODIFICATION USING MIXED REALITY

(71) Applicant: Samsung Electronics Co., Ltd., Suwon-si, Gyeonggi-do (KR)

(72) Inventors: Arun Rakesh Yoganandan, San Francisco, CA (US); Kyle T. McGill, San Jose, CA (US); Chang Long Zhu Jin, Sunnyvale, CA (US); Stacie L. Hibino, San Jose, CA (US); Kumi Akiyoshi, San Francisco, CA (US)

(73) Assignee: Samsung Electronics Co. Ltd., Suwon-si (KR)

( * ) Notice: Subject to any disclaimer, the term of this patent is extended or adjusted under 35 U.S.C. 154(b) by 0 days.

(21) Appl. No.: 15/850,310

(22) Filed: Dec. 21, 2017

(65) Prior Publication Data

US 2019/0191850 A1    Jun. 27, 2019

(51) Int. Cl.
| | |
|---|---|
| A45D 44/00 | (2006.01) |
| A47G 1/02 | (2006.01) |
| G06T 19/00 | (2011.01) |
| G06T 19/20 | (2011.01) |
| A47G 1/16 | (2006.01) |
| G06K 9/00 | (2006.01) |

(Continued)

(52) U.S. Cl.
CPC ........... *A45D 44/005* (2013.01); *A45D 42/08* (2013.01); *A47G 1/02* (2013.01); *A47G 1/16* (2013.01); *B26B 19/388* (2013.01); *B26B 21/4056* (2013.01); *B26B 21/4081* (2013.01); *B26B 21/4087* (2013.01); *G06F 3/011* (2013.01); *G06K 9/00228* (2013.01); *G06T 19/006* (2013.01); *G06T 19/20* (2013.01); *A47G 2200/205* (2013.01)

(58) Field of Classification Search
None
See application file for complete search history.

(56) References Cited

U.S. PATENT DOCUMENTS

| | | |
|---|---|---|
| 6,598,301 B2 | 7/2003 | McCool et al. |
| 6,920,236 B2 | 7/2005 | Prokoski |

(Continued)

FOREIGN PATENT DOCUMENTS

| | | |
|---|---|---|
| WO | 2017102859 A1 | 6/2017 |
| WO | 2017108699 A1 | 6/2017 |

OTHER PUBLICATIONS

Kristen Dold, "Stop What You're Doing and Try This Virtual FAcial Hair App Right Now", published on Sep. 16, 2013, retrieved from https://www.gq.com/story/stop-what-youre-doing-and-try-this-virtual-facial-hair-app-right-now.*

(Continued)

*Primary Examiner* — Zhengxi Liu
(74) *Attorney, Agent, or Firm* — Sherman IP LLP; Kenneth L. Sherman; Steven Laut

(57) ABSTRACT

A method includes retrieving, by a device, contextual information based on at least one of an image, the device, user context, or a combination thereof. At least one model is identified from multiple models based on the contextual information and at least one object recognized in an image based on at least one model. At least one icon is displayed at the device. The at least one icon being associated with at least one of an application, a service, or a combination thereof providing additional information.

20 Claims, 16 Drawing Sheets

(51) Int. Cl.
*A45D 42/08* (2006.01)
*G06F 3/01* (2006.01)
*B26B 21/40* (2006.01)
*B26B 19/38* (2006.01)

(56) References Cited

U.S. PATENT DOCUMENTS

| | | | |
|---|---|---|---|
| 7,714,912 | B2 | 5/2010 | Faisman et al. |
| 7,953,686 | B2 | 5/2011 | Angell et al. |
| 8,743,051 | B1 | 6/2014 | Moy et al. |
| 9,235,977 | B2 | 1/2016 | Deutsch |
| 2007/0035815 | A1 | 2/2007 | Edgar et al. |
| 2008/0252412 | A1 | 10/2008 | Larsson et al. |
| 2012/0044335 | A1 | 2/2012 | Goto |
| 2013/0129210 | A1 | 5/2013 | Won Na |
| 2014/0222200 | A1* | 8/2014 | Pierrot ............... B25J 9/1623 700/253 |
| 2015/0059187 | A1* | 3/2015 | Krenik ............... B26B 19/42 30/123 |
| 2015/0070274 | A1 | 3/2015 | Morozov |
| 2015/0113636 | A1 | 4/2015 | Forbes et al. |
| 2015/0197016 | A1* | 7/2015 | Krenik ............... B26B 19/3806 83/13 |
| 2015/0217465 | A1* | 8/2015 | Krenik ............... B26B 19/388 700/90 |
| 2016/0067872 | A1 | 3/2016 | Binder |
| 2016/0140986 | A1 | 5/2016 | Bowers et al. |
| 2016/0234465 | A1 | 8/2016 | Binder |
| 2016/0257009 | A1 | 9/2016 | Godlieb et al. |
| 2016/0262521 | A1* | 9/2016 | Kustra ............... A45D 24/36 |
| 2016/0324664 | A1 | 11/2016 | Piron et al. |
| 2017/0201722 | A1* | 7/2017 | Wilson ............... H04N 7/157 |
| 2018/0174347 | A1* | 6/2018 | Chaney ............... G06T 13/40 |

OTHER PUBLICATIONS

HairChitect, "HairChitect Mobile App", published on Nov. 2, 2016, retrieved from http://picdeer.com/media/1374335224960015870_2270057732 on Jul. 22, 2019.*

Hua, K. "The Best Beauty Tech Products at CES 2017," Article, Forbes, Jan. 4, 2017, pp. 1-8, United States [downloaded from http://www.forbes.com/sites/karenhua/2017/01/04/the-best-beauty-products-at-ces-2017/#799a02943264 on Nov. 13, 2017].

Anonymous, "Panasonic's Smart Mirror Shows You Great Makeup Ideas for Your Face,"Blog, Wonderful Engineering, pp. 1-4, United States [downloaded from http://wonderfulengineering.com/panasonics-smart-mirror-shows-you-how-to-do-better-makeup/ on Nov. 13, 2017].

Goode, L. "Withings and L'Oreal have made a smart hair brush, in the latest edition of 'You're doing it wrong'" Article, The Verge, Jan. 3, 2017, pp. 1-3, United States [downloaded from http://www.theverge.com/ces/2017/1/3/14128510/withings-loreal-smart-wifi-hair-brush-announcedces-2017 on Nov. 13, 2017].

International Search Report and Written Opinion dated Apr. 8, 2019 for International Application PCT/KR2018/016483 from Korean Intellectual Property Office, pp. 1-9, Republic of Korea.

* cited by examiner

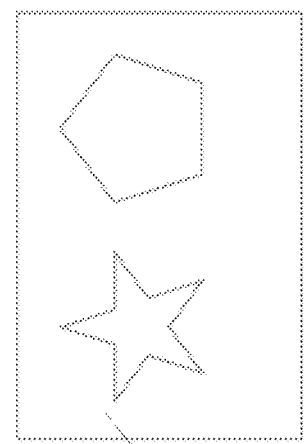
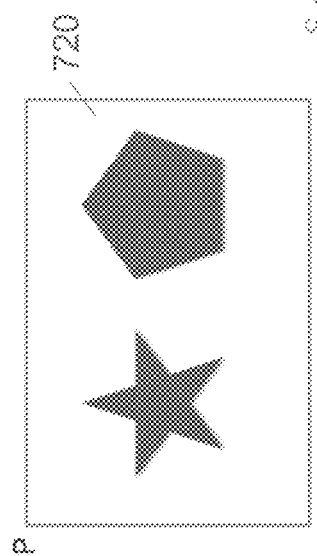
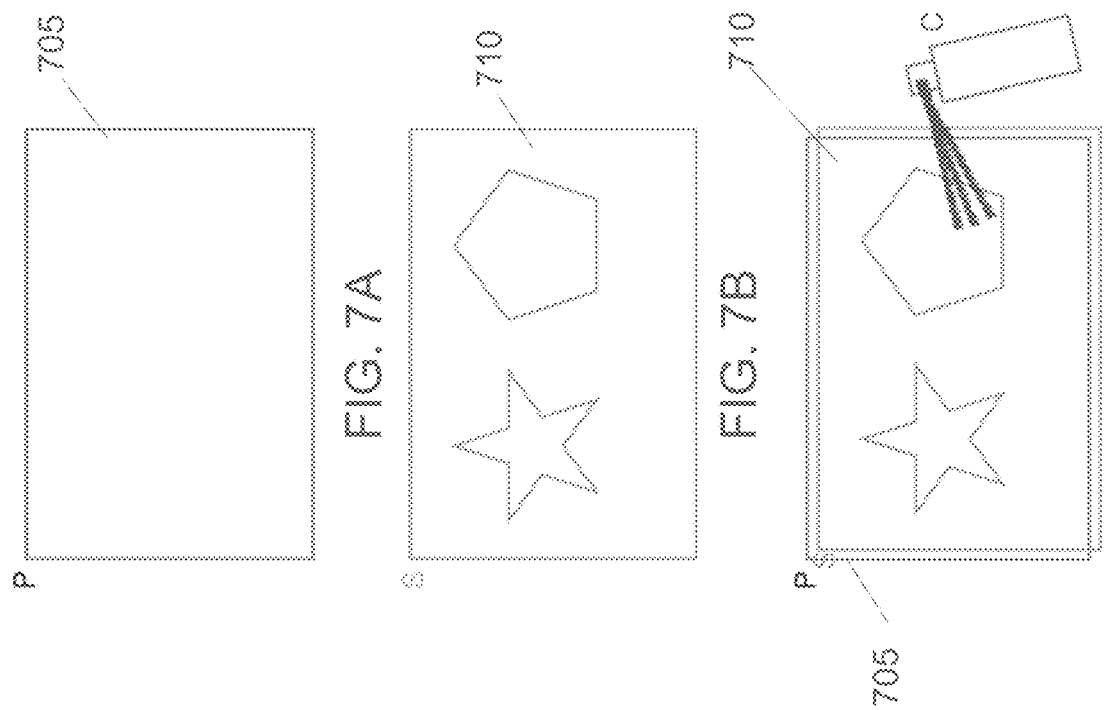
FIG. 7A  FIG. 7B  FIG. 7C  FIG. 7D

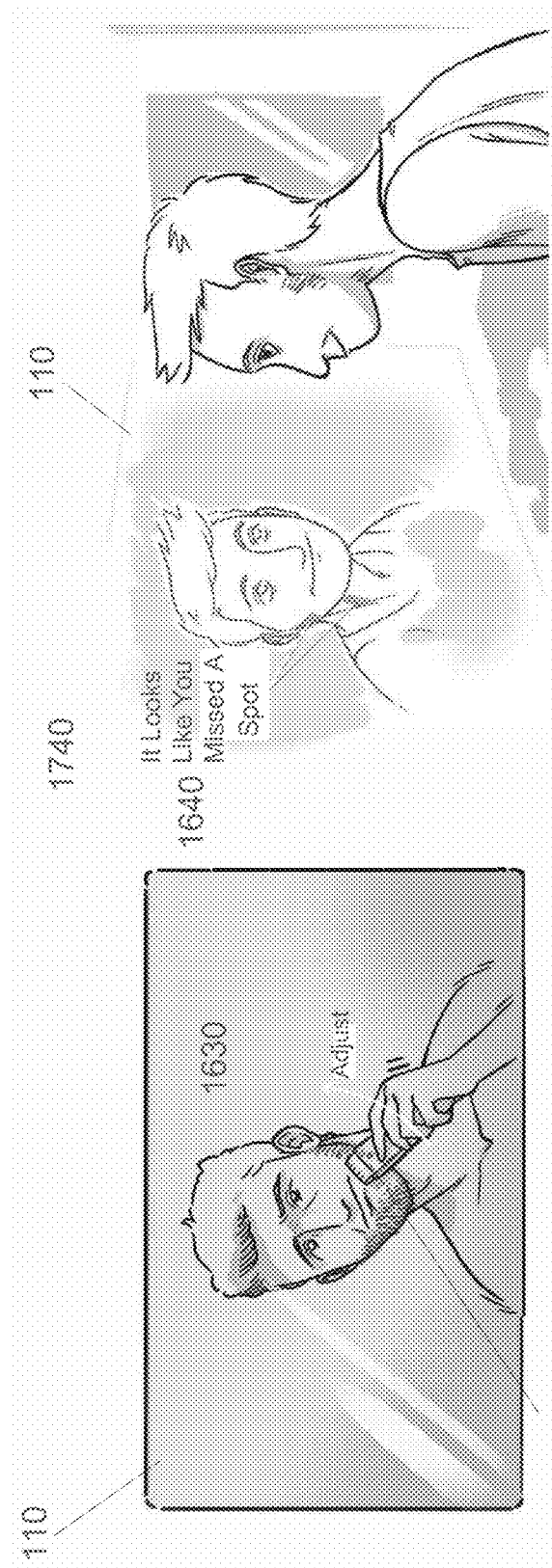

2300

Receiving First Information, By A First Electronic Device, For A Superimposed Heat Map That Is Mapped To A Three-Dimensional Mask For An Object — 2310

Receiving Second Information For Detection Of Contact Of A Second Electronic Device With The Object — 2320

Providing Communication To The Second Electronic Device Based On Determining Position Of The Second Electronic Device In Relation To The Object And The Superimposed Heat Map — 2330

FIG. 23

SYSTEM AND METHOD FOR OBJECT MODIFICATION USING MIXED REALITY

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to mixed reality, and in particular, to use of mixed reality for object modification using an electronic device.

BACKGROUND

With the rise of different cultures and trends in fashion, facial grooming needs are more important than ever before. Facial hair styles serve as a means of identity and self-expression. Unfortunately, crafting a look and maintaining it is not all that easy to accomplish.

SUMMARY

One or more embodiments relate to using mixed reality for object modification using an electronic device. In some embodiments, a smart mirror device includes a memory that stores instructions, and a processor that executes the instructions to: receive first information associated with a superimposed heat map that is mapped to a three-dimensional mask for an object, receive second information for detection of contact of an electronic device with the object, and provide communication to the electronic device based on determining position of the electronic device in relation to the object and the superimposed heat map.

In several embodiments, a method includes receiving first information, by a first electronic device, for a superimposed heat map that is mapped to a three-dimensional mask for an object. Second information is received for detection of contact of a second electronic device with the object. Communication is provided to the second electronic device based on determining position of the second electronic device in relation to the object and the superimposed heat map.

In some embodiments, a non-transitory processor-readable medium that includes a program that when executed by a processor performs a method. The method comprises receiving first information for a superimposed heat map that is mapped to a three-dimensional mask for an object. Second information is received based on detection of contact of an electronic device with the object. Generation of communication for the electronic device is caused based on determining position of the second electronic device in relation to the object and the superimposed heat map.

These and other features, aspects and advantages of the one or more embodiments will become understood with reference to the following description, appended claims and accompanying figures.

BRIEF DESCRIPTION OF THE DRAWINGS

FIGS. 7A-D shows example uses of a stencil/overlay;

FIG. 16 shows an example of graphical information provided by a smart mirror, according to some embodiments;

FIG. 17 shows an example of textual and reflective information provided by a smart mirror, according to some embodiments;

FIG. 18 shows an example of a template overlay mapped to a facial object provided by a smart mirror, according to some embodiments;

FIG. 23 shows a block diagram for a process for object modification using mixed reality, according to some embodiments.

DETAILED DESCRIPTION

Figure 1:
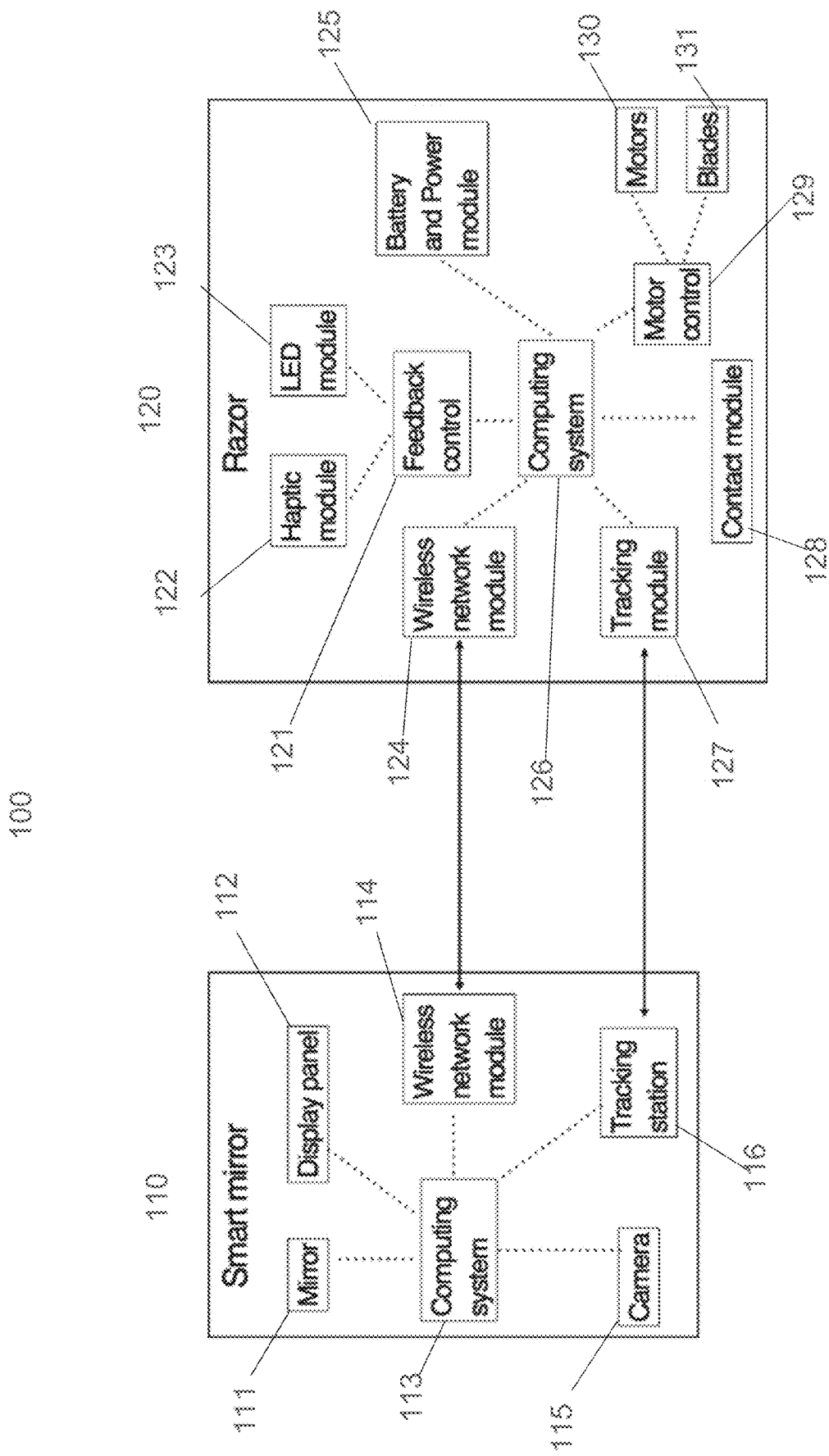
FIG. 1 shows an example system architecture for object modification using mixed reality, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments provide for using mixed reality for object modification using an electronic device. In some embodiments, a smart mirror device includes a memory that stores instructions, and a processor that executes the instructions to: receive first information associated with a superimposed heat map that is mapped to a three-dimensional mask for an object, receive second information for detection of contact of an electronic device with the object, and provide communication to the electronic device based on determining position of the electronic device in relation to the object and the superimposed heat map.

A few issues with creating and maintaining a facial hairstyle may include lacking the requisite grooming skill. Like any other form of styling, facial grooming requires a skill on the user's end to achieve moderate to sophisticated looks. This is especially valid for creating unconventional looks that accentuate clear borders, curves and symmetry. Users need to be proficient with using their tools in order to pull off the look they desire. The average user's skill levels may be well below this requirement and hence, they do not even attempt to go for many desired styles. Apart from skill, achieving a certain look requires investing considerable amount of time and effort. Additionally, further time is spent in maintaining that style. Achieving certain styles require using a multitude of tools, each for a specific effect or purpose. To create custom styles and advanced looks requires creativity and imagination. The average person may lack the ability to research and create such new styles and hence falls back to the safest style possible. To achieve a particular look, the user may have to go through several rounds of trial and error before they lock on to a particular look. Most users cannot afford such trial and experimentation due to reasons such as a public facing job, established public image, etc. For those who lack the skill or time to invest in self grooming, the only recourse would be a professional hair stylist. Cost associated with using a professional stylist is not only for the first visit to achieve the look, but also for repeated visits to maintain it. For example, a razor club may charge close to a $1,000.00 for membership to exclusive salons.

The market is flooded with tools and solutions for facial grooming but they all suffer from the following issues. Current tools do not know anything about the user, their facial structure, their skin etc. There is no customization in the solution or service. Current tools do not know anything about the style the user is trying to achieve. While improvements in machining processes have resulted in sleeker blades and better ergonomics to grip razors, they are about the same as their predecessors from 40 years ago. The onus of achieving a look is completely on the user as there is no feedback. Current systems provide no feedback about the user's progress or provide guidance on the best way to go about their shave in order to achieve the intended look. A user might be using the wrong settings, ruining the possibility of a look and they would not know until a later time.

FIG. 1 shows an example system architecture 100 for object modification using mixed reality, according to some embodiments. In one embodiment, the system 100 includes a smart (electronic) mirror 110 and smart (electronic) razor 120. The smart mirror 110 includes a mirror 111, display panel 112, computing system 113, a wireless network module 114, a camera 115 and tracking station 116. The smart razor includes feedback control 121, a haptic module 122, a light emitting diode (LED) module 123, a wireless network module 124, a battery and power module 125, a computing system 126, a tracking module 127, a contact module 128, motor control 129 including one or more motors 130 and blades 131. In some embodiments, the system 100 provides users to get professional quality results without much effort and with little to no skills required. The system 100 makes use of latest advances in computer vision, 3-D sensing, actuation, haptic and visual feedback and mixed reality to provide beauty experiences. It should be noted that many of the components of the smart mirror 110 may be included or simulated using other electronic devices including a camera or that may use a coupled camera, such as a smart cell phone, a tablet computing device, a personal computer (PC), wearable electronic device, etc.

In one embodiment, the smart mirror 110 may be available in multiple sizes, including large wall sizes, medicine cabinet sizes, personal mirror sizes, etc. In some embodiments, the smart mirror 110 houses the computing system 113 that provides the output rendered by the display panel 112. The camera 115 is embedded in the mirror 111, which is used to capture the environment in front of the mirror 111 and hand over the same to the computing system 113 for image processing. The computing system 113 may also house the wireless network module 114 hardware for wireless communication and the tracking station 116.

The computing system 113 may include one or more hardware processors, memory devices (e.g., one or more of: random access memory (RAM), flash memory, removable memory, cache memory, etc.). The wireless network module 114 may include hardware and software for enabling transmitting and receiving network traffic (e.g., Wi-Fi, BLUETOOTH®, etc.) over a local network, the Internet, etc. The tracking station 116 provides tracking of objects and devices (e.g., a facial object, the razor 120, etc.). The smart mirror 110 blends a mirror 111 and display panel 112 together. At any point within its frame, users can not only see reflections from the mirror 111 (just like in a regular mirror), but also view pixels and digital content of an electronic display using the display panel 112. In one example, the mirror 111 is a semi-transparent mirror.

In some embodiments, the display panel 112 provides for imaging (e.g., graphic text, images, video, etc.) projected or displayed through or on the mirror 111 to provide information (e.g., feedback indications, selectable templates, time, weather information, calendar information, traffic information, social media information/content/messaging, video from security cameras, etc.). The display panel 112 may include one or more speakers for audio information, feedback, warnings, alerts, etc.

In one embodiment, the wireless network module 124 of the smart razor 120 may include hardware and software for enabling transmitting and receiving network traffic (e.g., Wi-Fi, BLUETOOTH®, etc.) over a local network, the Internet, etc. The wireless network module 124 communicates with the wireless network module 114 and may include comparable components. The feedback control 121 provides feedback from use of the smart mirror 110 with the smart razor 120. The feedback may be based on relative position and orientation between the smart mirror 110 and the smart razor 120, progress in use of the smart razor 120, etc. The haptic module 122 may include one or more haptic electronic motor devices used for haptic feedback or vibration indications provided in the razor 120. The LED module 123 includes one or more LEDs and provides lighting indications for feedback or communications from either the smart mirror 110 or the razor 120 itself. The lighting indications may include different color light emissions (e.g., red, green, yellow, etc.), different pattern exhibited such as blinking indications, lighted arrows, etc. The battery and power module 125 may include a rechargeable battery and ports for an AC/DC adapter, USB connector, etc. The computing system 126 may include one or more hardware processors, memory devices (e.g., one or more of: random access memory (RAM), flash memory, removable memory, cache memory, etc.). The tracking module 127 communicates with the tracking station 116 for tracking update information (e.g., position, orientation, etc.). The contact module 128 may provide information for when contact of the smart razor 120 with a surface of an object occurs based on one or more of a contact sensor, a proximity sensor, a pressure sensor, etc. The motor control 129 may include hardware for controlling the motors 130 (e.g., one or more of: speed, blades 131 direction, ON/OFF, etc.).

In some embodiments, the system 100 provides almost zero cognitive load on the user irrespective of how complicated a look (e.g., facial hair styling) the user is trying to achieve. Users with little to no skills can achieve looks with the same level of sophistication as an expert user. Users can select standard templates and previsualize the look on them before committing to it. Constant visual, auditory and haptic feedback guide user in the right direction and ensure the intended look is achieved. The razor 120 automatically adjusts several settings based on its current location, without the user having to manually make adjustments. Therefore, the users are never interrupted and may continue to perform the same operation while the device appropriately adapts and adjusts. The system 100 provides real-time visual feedback, both on hardware and as mixed reality visualizations collocated with the user's face, which makes the process very intuitive and keeps the user informed of the current state. The system 100 provides ability to purchase or obtain hand crafted templates from experts and use them for styling. Since the user is not really involved in a manual grooming process, shaving/trimming may occur at a much faster rate, resulting in saved time for both achieving and maintaining a style. Precision of finish is high since all calculations by the computing system 113 are performed based on the user's face. Ability to manually override and stay away from the template is also provided, which allows users to customize/modify templates and save them for future re-use.

Figure 2:
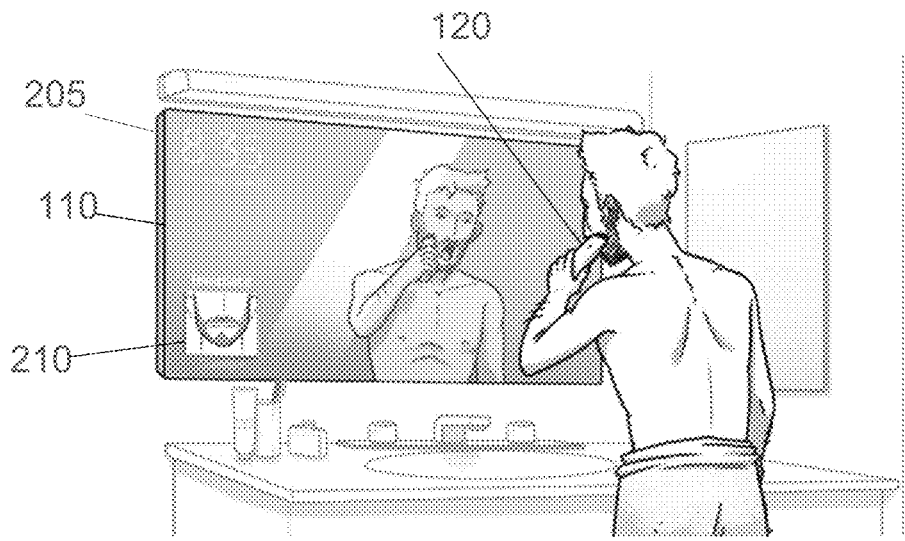
FIG. 2 shows an example system for object modification using mixed reality, according to some embodiments.

FIG. 2 shows an example system for object (e.g., a face) modification (e.g., styling modification) using mixed reality, according to some embodiments. In the example system including the smart mirror 110 and smart razor 120, the user is provided with information on the smart mirror 110. As shown, the smart mirror 110 shows the time/date and a template 210 (e.g., selected by a user) for a facial hair style that may be applied to the user using the system.

Figure 3:
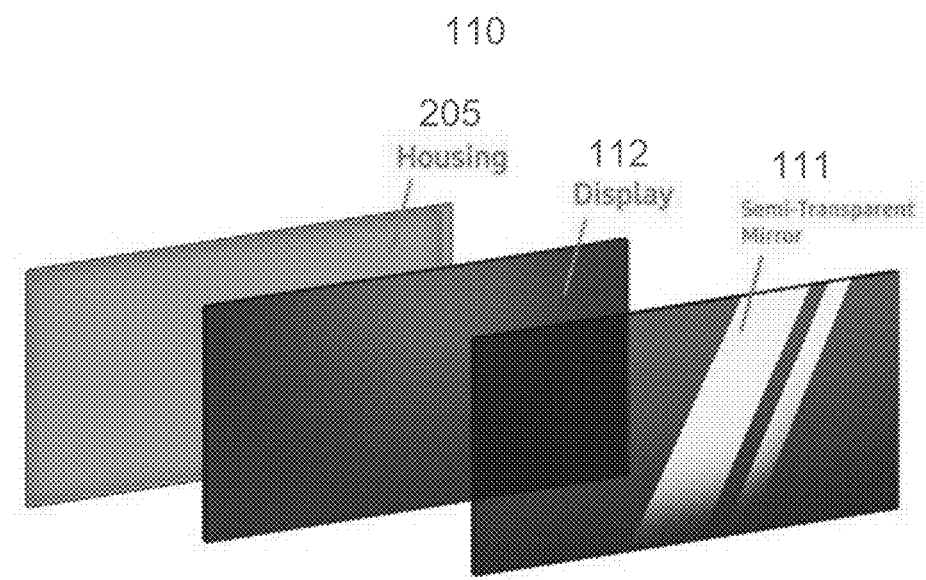
FIG. 3 shows an example architecture for a smart mirror, according to an embodiment.

FIG. 3 shows an example architecture for the smart mirror 110, according to an embodiment. In some embodiments, the smart mirror 110 includes a housing 205, display panel 112 and the mirror 111. In one example, the smart mirror 110 overlays the mirror 111 (e.g., a semi-transparent (two way or half silvered) mirror) on top of the display panel 112. The semi-transparent mirror 111 allows for the user to see reflections, but also to see past it onto the content rendered on the display panel 112. In another embodiment, the display 112 may be transparent and is overlaid on top of the mirror 111, which is an opaque mirror.

Figure 4:
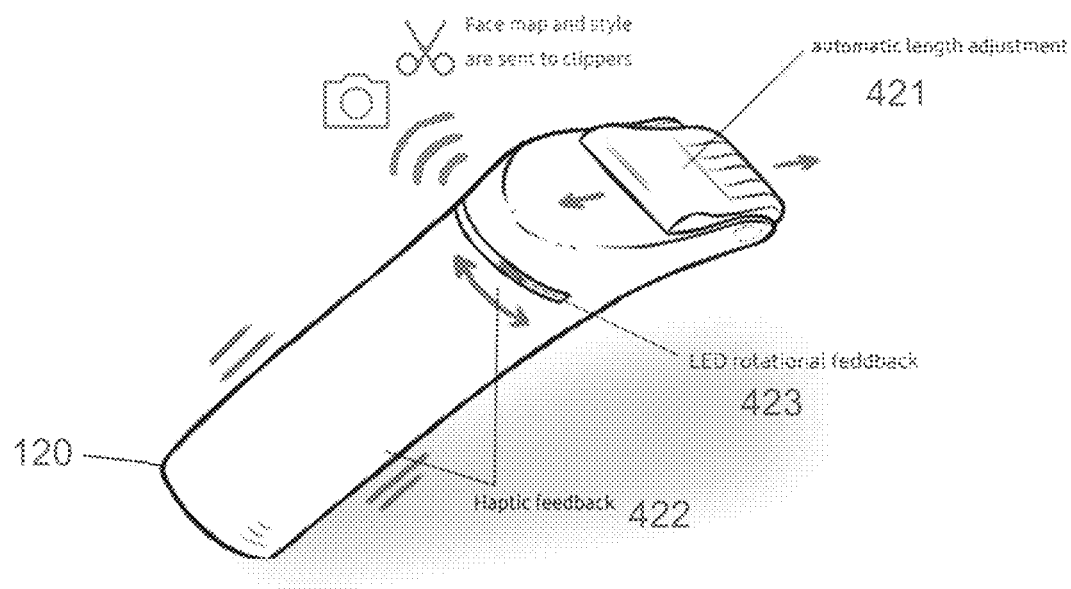
FIG. 4 shows an example smart razor electronic device, according to an embodiment.

FIG. 4 shows an example smart razor 120 electronic device, according to an embodiment. In one embodiment, the smart razor 120 includes a moveable brush/comb/blades 421 that provides for automatic adjustment of the smart razor 120. In one example, the moveable brush/comb/blades 421 moves to adjust length of hair desired (e.g., shorter or longer). In one example, the smart razor 120 includes haptic motors to provide haptic feedback 422 at various locations on the housing of the smart razor 120 to alert a user how to move and orient the smart razor 120 based on sensed vibrations. The light element 423 may include one or more LEDs 423 for indicating rotation communication or feedback. The smart razor 120 may receive information 424 for a facial heat map and information for the selected style (e.g., facial hair style) through a wireless connection using the wireless network module 124 (FIG. 1).

In some embodiments, the smart razor 120 is wirelessly connected to the smart mirror 110 (FIG. 1) and constantly communicates with the computing system 113. The smart razor 110 features a six degree of freedom (6DOF) position and orientation tracking module(s) 127, which is (are) used to estimate the accurate position and orientation of the smart razor 120 with respect to the smart mirror 110. This can be achieved by various types of tracking technologies, such as magnetic, optical, ultrasound, etc., with the base of the tracking station 116 positioned within the smart mirror 110, in combination with an Inertial Measurement Unit (IMU) embedded in the smart razor 120.

In some embodiments, the smart razor 120 contains blades 131 (FIG. 1) at its tip, which is used to perform the grooming operation. The smart razor 120 contains its own computing system 126 that wirelessly communicates with the smart mirror 110 and coordinates sensors and actuators present within it. The smart razor 120 features an array of LEDs 423 around the circumference of the smart razor 120, which is driven by the computing system 126 and LED module 123, and is used to provide visual feedback for the user. Additionally, the smart razor 120 also contains haptic motors/actuators on the handle of the razor to give instructions (haptic feedback 422) to the user on the correct orientation and direction to where the user needs to move the smart razor 120. Furthermore, motors are present to modify the thickness of the blades 131 or adjust the output of the comb/brush, which are both connected to and controlled by the computing system 126 and motor control 129. The smart razor 120 includes proximity and contact sensors that can detect when the smart razor 120 actually touches the user's skin or hair, or in different degrees of proximity, in order to activate the smart razor 120.

Figure 5:
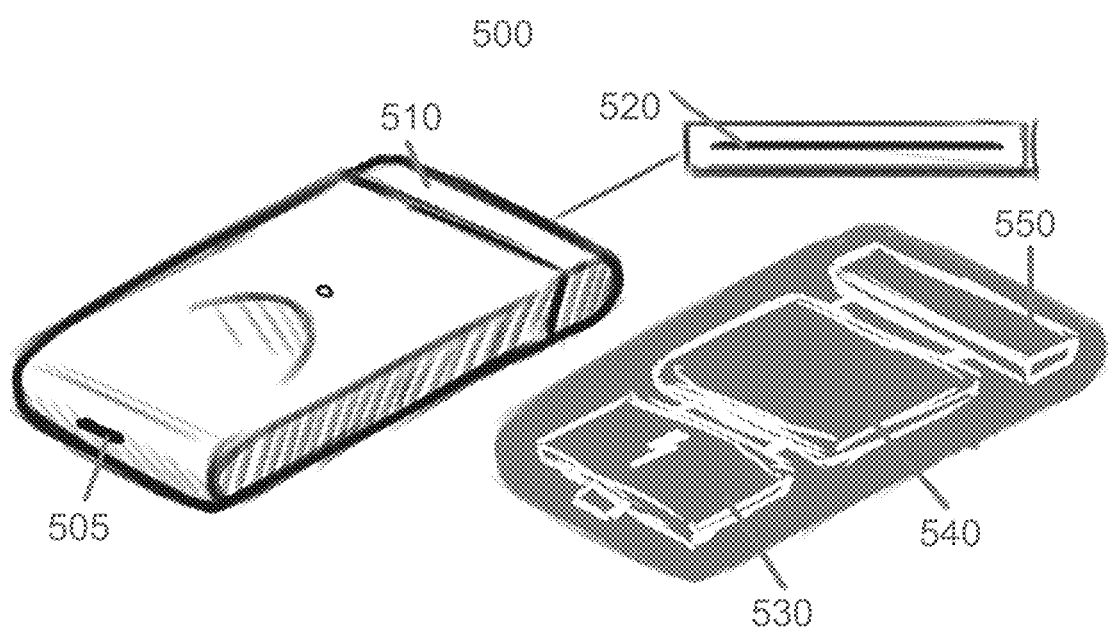
FIG. 5 shows an example applicator device, according to an embodiment.

FIG. 5 shows an example applicator device 500, according to an embodiment. In one embodiment, similar elements from the smart razor 120 (FIG. 2) may be applied to other devices, such as the applicator device 500 for providing face painting, temporary tattoos, or even applied to an automated tattoo device including an automated needle and ink supply. In some embodiments, the applicator device 500 includes a charge input 505 (port), an applicator 510 with a paint print output 520, a (rechargeable) battery 530, gyros and sensors 540 and a removable/replaceable paint cartridge 550.

In one embodiment, the applicator device 500 is separate from the smart mirror 110 (FIGS. 1-3), which is wirelessly connected to it and constantly communicates with a computing system (e.g., computing system 126). The applicator device 500 features 6DOF position and orientation tracking within it, which is used to estimate the accurate position and orientation of the applicator device 500 with respect to the smart mirror 110. This can be achieved by various type of tracking technologies such as magnetic, optical, ultra sound etc., with the base of the tracking station 116 positioned within the smart mirror 110, in combination with an internal IMU for added accuracy. In one example, the applicator device 500 contains a nozzle at its tip, which is connected to various ink/paint cartridges 550 on the inside of the applicator device 500.

In some embodiments, the applicator device 500 contains its own computing system (e.g., computing system 126, FIG. 1), that wirelessly communicates with the smart mirror 110 and coordinates the sensors and actuators present within it. The applicator device 500 features an array of LEDs around the circumference of the applicator device 500, which is driven by the computing system and is used to provide visual feedback for the user. Additionally, the applicator device 500 also contains haptic actuators on the handle of the applicator device 500 and motors for adjusting the flow of ink through the applicator device 500, which is in turn connected to and controlled by the computing system.

Figure 6A:
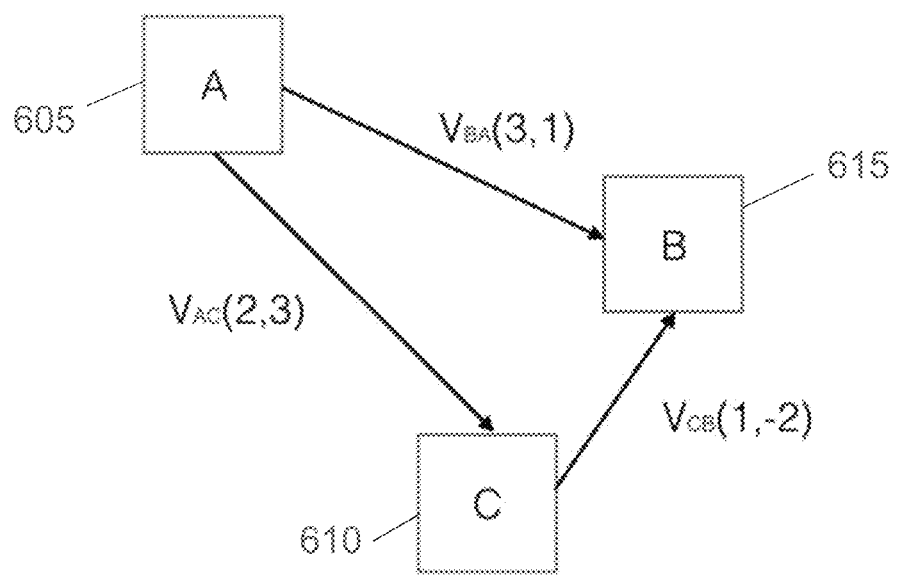
FIGS. 6A-B show examples of multiple object position relationships.
Figure 6B:
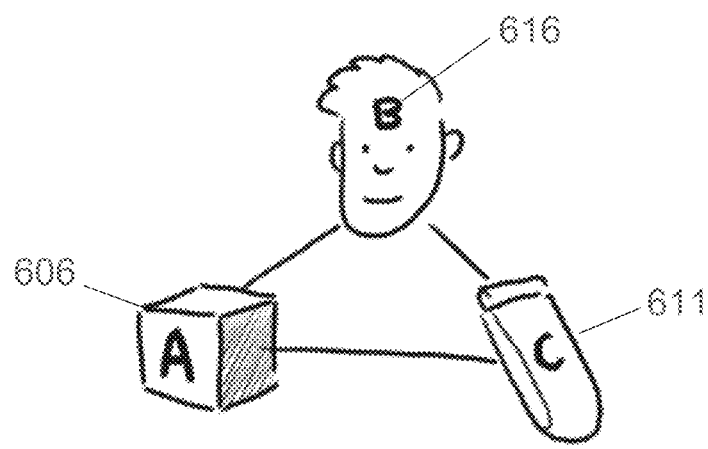

FIGS. 6A-B show examples of multiple object position relationships.

Consider objects A 605, B 615 and C 610 on a two-dimensional (2-D) plane. If B's 615 position is known with respect to A 605, and C's 610 position is known with respect to A 605, then B's 615 position with respect to C 610 may be deduced using vector mathematics. For example, if it is known that object B 615 is 3 units to the right and 1 unit below A 605, and if it is known that object C 610 is 2 units to the right and 3 units below A 605, then the position of B 615 with respect to C 610 may be computed to be 1 unit to the right and 2 units above C 610. Even if B 615 and C 610 are constantly moving randomly with respect to A 605, the relative position for each of these may still be computed. This relationship could similarly be extended as shown in FIG. 6B to a 3-D scenario to compute the relative position between 3-D objects B 616 and C 611, which is referred to herein as relative transformation. With some additional vector mathematical computations, this relationship can also be extended to calculate relative orientation between objects B 616 and C 611. Therefore, when B 616 is the user's face, C 611 is the razor and A 606 is the tracking station 116 (FIG. 1) within the smart mirror 110 (FIGS. 1-3), the relative position and orientations may be computed by the system 100.

FIGS. 7A-D shows example uses of a stencil/overlay that may be applied to some embodiments. Some embodiments employ masked control of interaction. Consider a piece of paper P 705 and a stencil S 710 with a star and a pentagon shape cut away. If the stencil S 710 is placed on top of P 705 and a can C of paint is used to spray on to it, the stencil S 710 allows certain regions of the paper P 705 to be painted, while prevents the other regions of the paper P 705 from being sprayed. On removing the stencil S 710, a clear painting 720 with well-defined boundaries and edges are obtained. In some embodiments, P 705 is a user's face, S 710 is a beard template chosen by the user, and the smart razor 120 replaces the can C.

Figure 8:
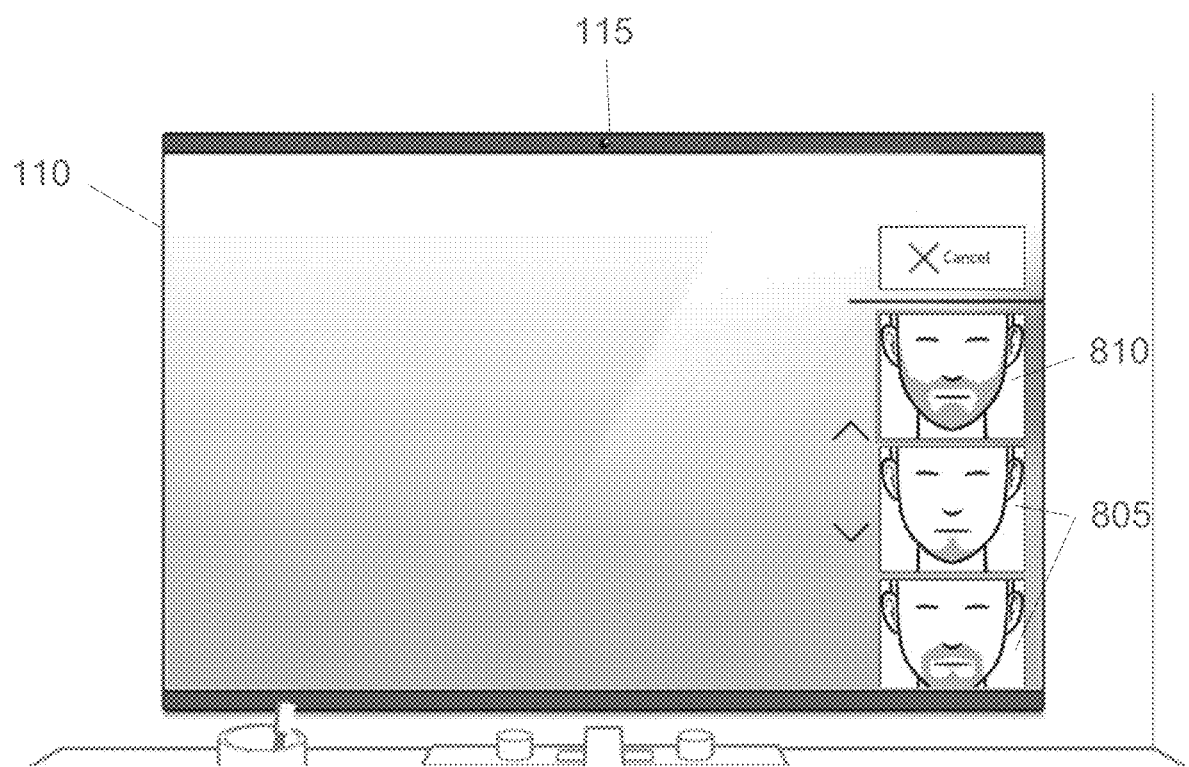
FIG. 8 shows an example smart mirror indicating various selectable facial templates, according to an embodiment.

FIG. 8 shows an example smart mirror 110 indicating various selectable facial templates 805, according to an embodiment. In one example, a user decides to have a shave and stands in front of the smart mirror 110. The user then uses the smart mirror 110 to browse through various templates 805 of beard styles and selects template 810. The smart mirror 110 then kickstarts the face tracking station 116 (FIG. 1) that starts to track the facial features of the user continuously in real-time. This allows the computing system 113 to compute both the 3-D position and orientation of the user's facial features and represent them as markers in a graphics application running on the display panel 112.

Figure 9A:
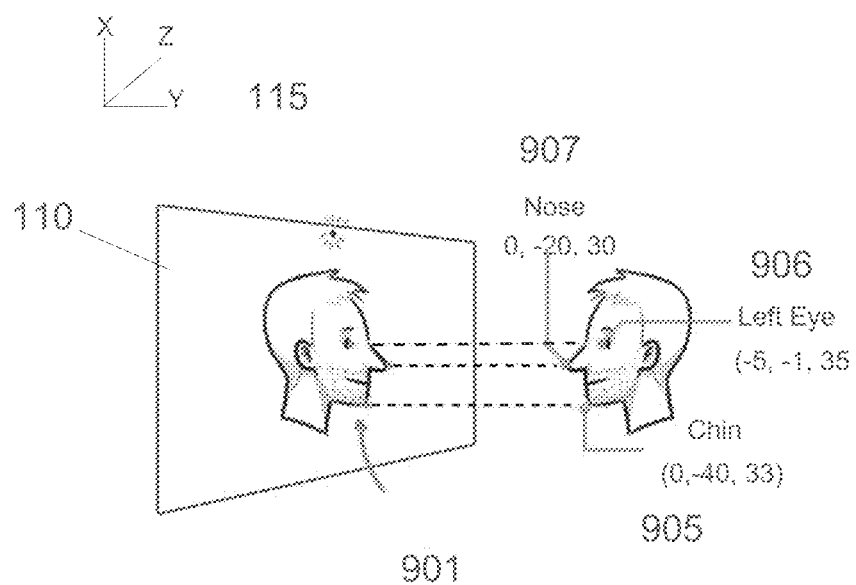
FIG. 9A shows an example of spatial relationships for tracked features, according to an embodiment.

FIG. 9A shows an example of spatial relationships for tracked features, according to an embodiment. The 3-D markers 905, 906 and 907 appear exactly super imposed on the real reflection of the user's tracked facial (physical) features 901 that they represent. For example, the marker 907 corresponding to the nose of the user will appear exactly super imposed on the real reflection 901 of the user's nose on the smart mirror 110. This is achieved by correct placement of the physical camera 115 on the smart mirror 110 followed by a series of steps involving calibration, warping and image processing.

Figure 9B:
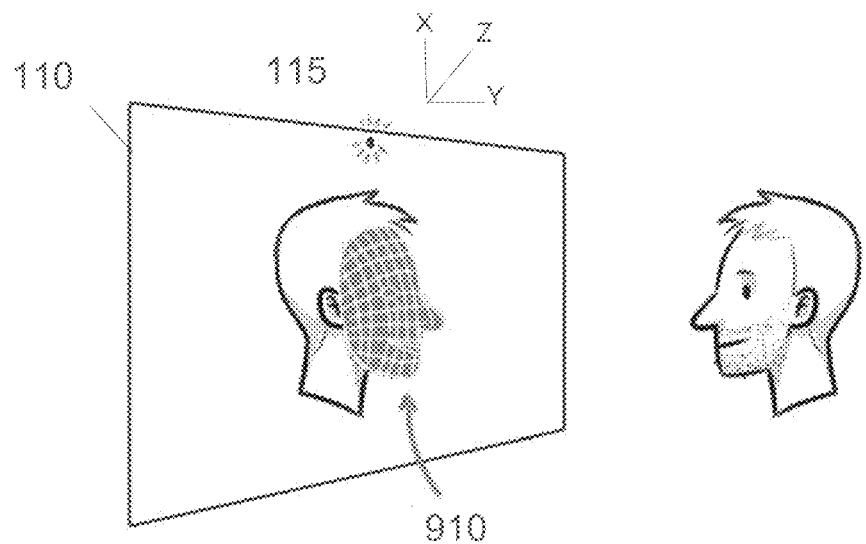
FIG. 9B shows an example of a constructed three-dimensional (3-D) mesh for representing a shape of an object based on spatial relationships for tracked features, according to an embodiment.
Figures 10A, 10B, 10C, 10D:
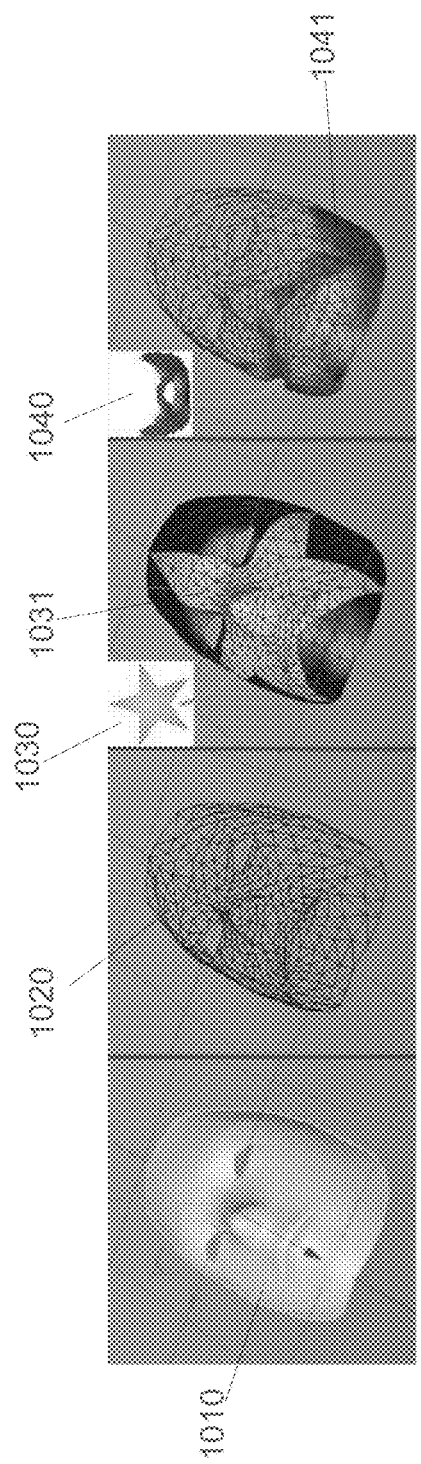
FIGS. 10A-D show examples of 3-D masks used to map textures, according to an embodiment.

FIG. 9B shows an example of a constructed 3-D mesh 910 for representing a shape of an object (e.g., a face) based on spatial relationships for tracked facial features 901, according to an embodiment. The spatial relationship between these 3-D markers is the same as the corresponding spatial relationship between the tracked facial features 901 of the user. These 3-D markers may then be used to reconstruct a 3-D mesh 910 that approximately represents the shape of the user's face. This rough 3-D mesh acts as a 3-D mask which appears exactly super imposed on the real reflection of the user's head, matching the user's current head position and orientation.

FIGS. 10A-D show examples of 3-D masks used to map textures, according to an embodiment. The 3-D mask 1010, like any other 3-D mesh 1020, may be used to map textures 1030 to the mask 1010 resulting in the mask 1031. The graphics application renders different effects on the 3-D mask and to the user, it appears in their reflection as though that effect is actually happening on their face. These effects could even be just transparency in certain regions. In one example, a beard 1040 with texture is mapped to a mesh 1041.

Figure 11:
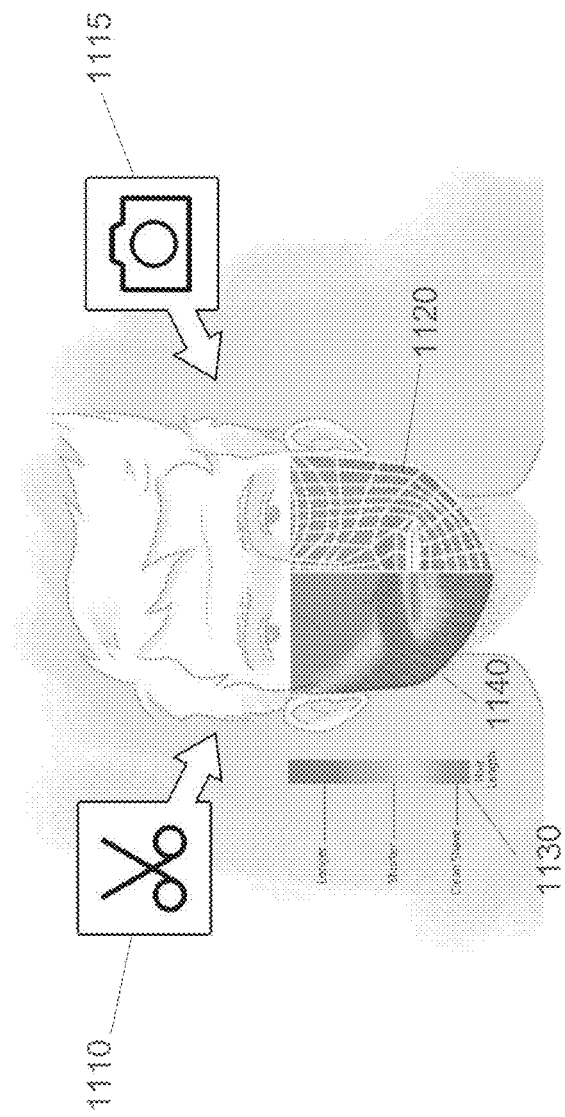
FIG. 11 shows an example of a heat map superimposed on a reflection of a face, according to some embodiments.

FIG. 11 shows an example of a heat map 1140 superimposed on a reflection of a face, according to some embodiments. The smart mirror 110 (FIGS. 1-3) uses the selected beard template 1110 as a texture and then super imposes the selected beard style on to the 3-D mask 1120 (using the image information 1115) and in turn on the reflection of the user's face in an appropriate manner. This would allow the viewer to preview how a style would suit them. The user then confirms the style after preview. The smart mirror 110 draws a heat map 1140 super imposed on the reflection of the user's face. The heat map 1140 serves the purpose of visually communicating to the user details such as: regions 1130 where the razor will not trim; regions 1130 where the razor will trim and to what thickness or with what setting. In some embodiments, the heat map 1140 is based off of the template 1110 that the user selects. Every template is associated with a heat map that details how much thickness should be in each region.

In some embodiments, the heat map 1140 uses various variables such as colors, shading and pattern, etc., to express the same. For example, a green color may denote areas where the smart razor 120 (FIGS. 1, 2 and 4) will have a longer blade length, in order to leave behind a consistent beard thickness. In regions with an orange color, the smart razor 120 will trim all the way to zero thickness. This gives the user an assurance that the right areas are going to be covered.

In some embodiments, the user reaches out and grabs the smart razor 120 from a stand. The user then turns on the smart razor 120 and brings it to their face. The 6DOF tracking on the smart razor 120 continuously communicates its 3-D position and orientation with the smart mirror 120, and provides additional details via sensors on the surface of the smart razor 120 as to whether it is in physical contact with the user's face or not.

Figure 12:
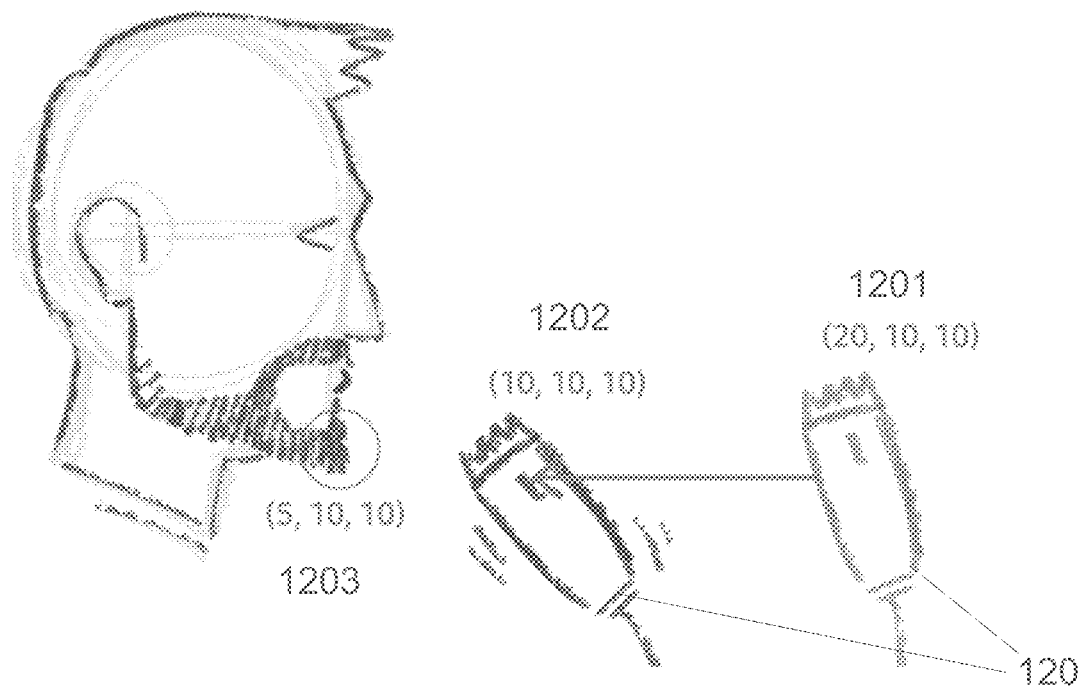
FIG. 12 shows an example of 3-D position and orientation tracking, according to some embodiments.

FIG. 12 shows an example of 3-D position and orientation tracking, according to some embodiments. Referring to the 'relative transformation' described with respect to FIGS. 6A-B, the computing system 113 (FIG. 1) computes the relative position and orientation of the smart razor 120 with respect to the user's face. Facial tracking, using the tracking station 116 and the tracking module 127, provides the user's face 3-D position and orientation with respect to the smart mirror 110 (FIGS. 1-3). The 6DOF tracking module 127 on the smart razor 120 provides 3-D position and orientation of the smart razor 120 with respect to the smart mirror 110. Therefore, the computing system 113 may estimate the 3-D position and orientation of the smart razor 120 with respect to the user's face. That is, the smart mirror 110 can determine that the smart razor 120 is by the chin 1203, at a height above it (i.e., the position of the chin 1203 (5, 10, 10) relative to the re-located smart razor 120 position 1202 (10, 10, 10) from position 1201 (20, 10, 10).

Figure 13:
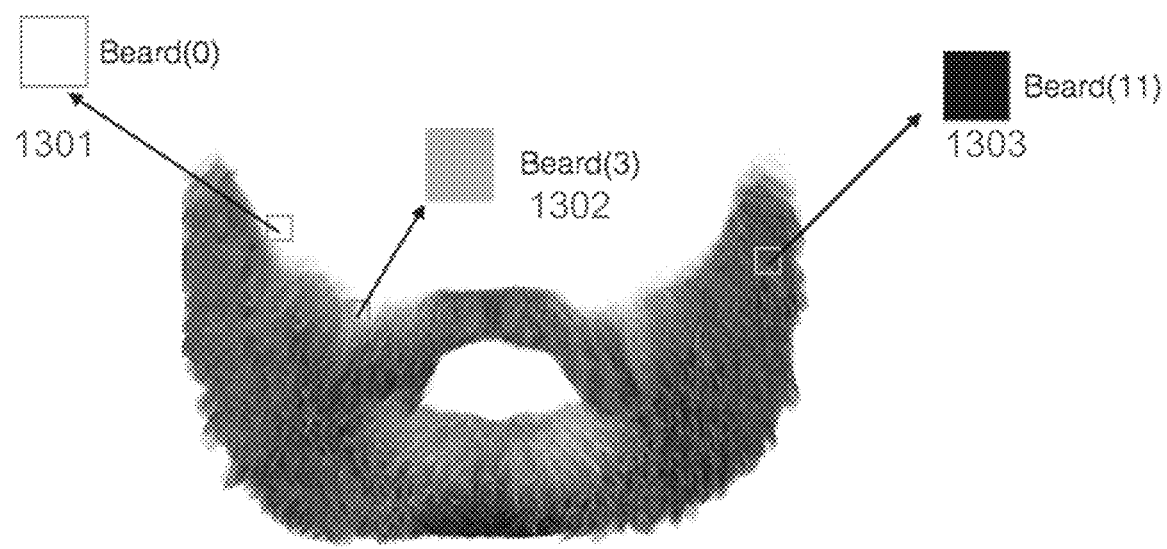
FIG. 13 shows an example use of texel values used for thickness of a beard, according to some embodiments.

FIG. 13 shows an example use of texel values used for thickness of a beard, according to some embodiments. Textures are made up of a matrix (rows and columns) of texture elements or texels. Each texel contains an individual color value (red, green and blue values ranging from 0-255), which represents a tiny portion of the image observed. In some use cases, such as scientific visualization, these texels are used to store not just the color at that region, but other physical characteristics corresponding to the region such as: pressure, magnitude of an earthquake, population density, etc. In some embodiments, the selected facial hair style template uses texel values as a way to store the thickness of the beard to be left behind in that region after trimming using the smart razor 120 (FIGS. 1, 2, 4 and 12). For example, a value of beard (0) 1301 for a texel may mean a clean shave, a value of beard (100) may mean a 2-inch thickness, a value of beard (200) may mean a 6-inch thickness, etc. As shown, it may readily be seen that beard (0) is a clean facial surface, beard (3) 1302 is at the edge of the beard, and beard (11) 1303 is additionally thicker than beard (3) 1302.

Referring back to the 'masked control of interaction' described above with reference to FIGS. 7A-D, some embodiments use that idea to compute settings for the smart razor 120. The chosen beard template acts as the stencil. Regions outside the stencil are trimmed down to a height of zero. For regions within the stencil area, the texel value at that location is retrieved. Based on this value, the height of the blade, comb or brush of the smart razor 120 is adjusted. For example, a texel value retrieved with a value of 100 automatically modifies the blade, comb or brush setting to 2 mm.

Figure 14A:
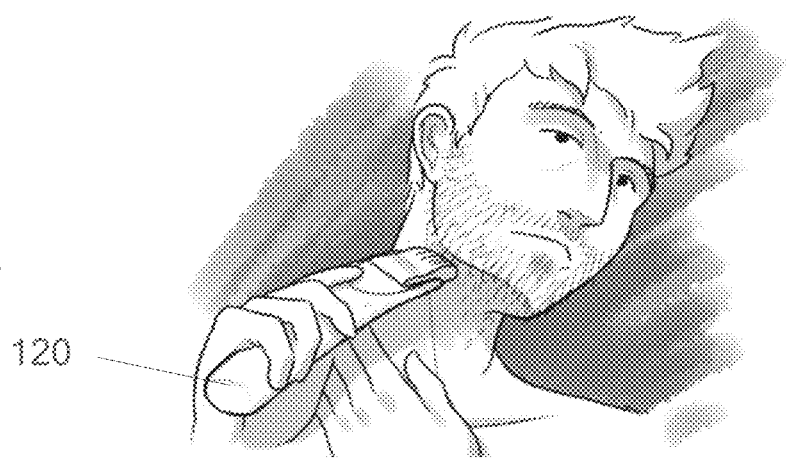
FIGS. 14A-C show an example of random movement of a razor over a face, communication between a smart mirror and the razor, and achievement of a desired effect, according to some embodiments.
Figure 14B:
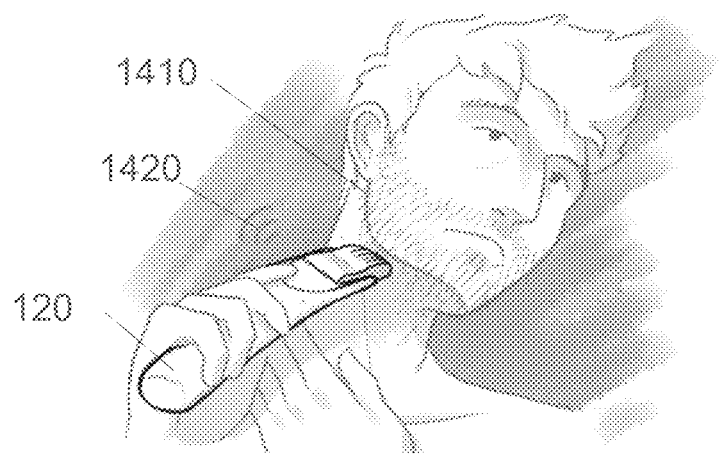
Figure 14C:
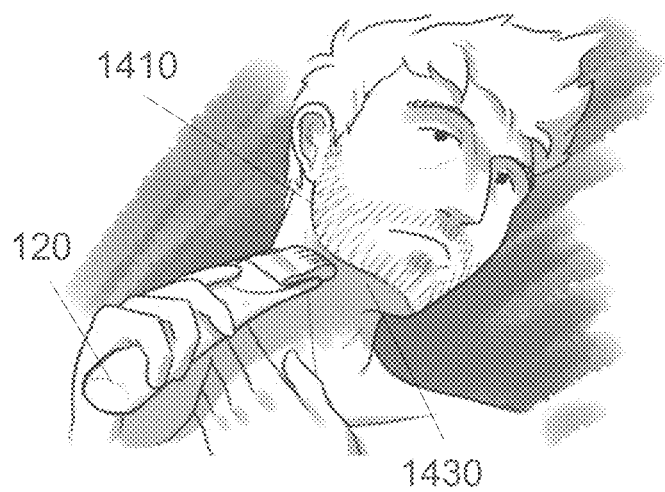
Figure 15A:
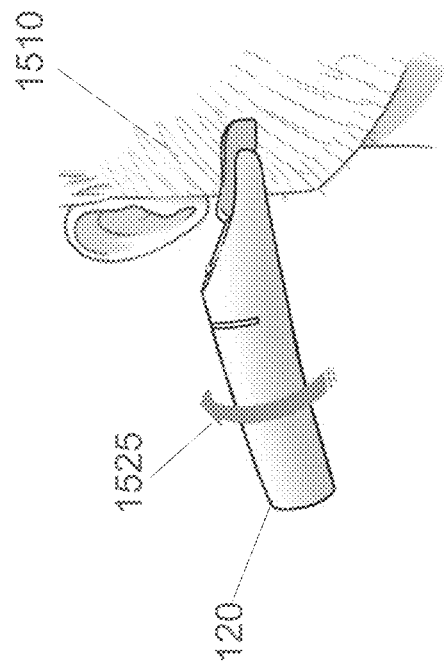
FIGS. 15A-D show an example of advanced grooming using feedback communication, according to some embodiments.
Figure 15C:
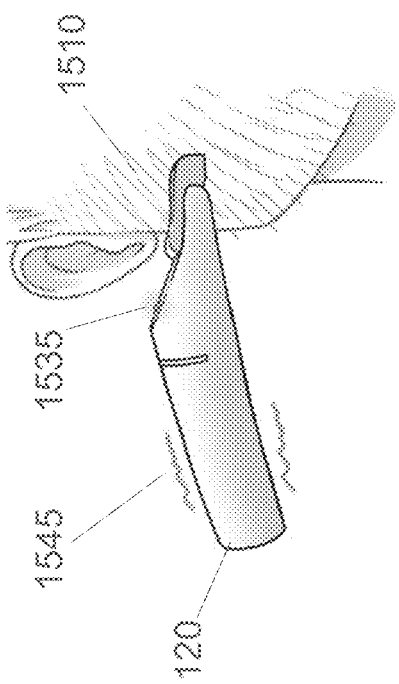
Figure 15B:
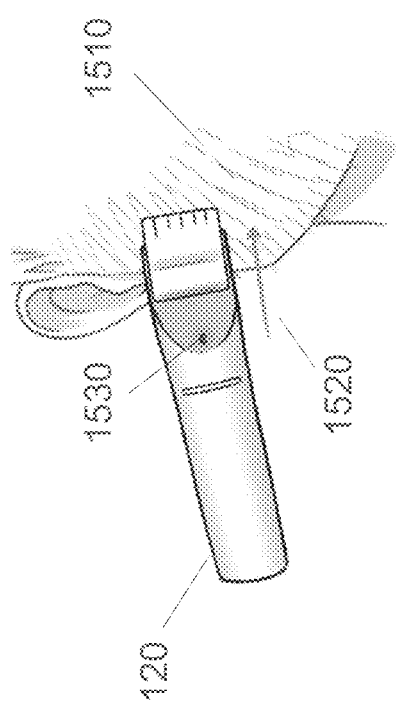
Figure 15D:
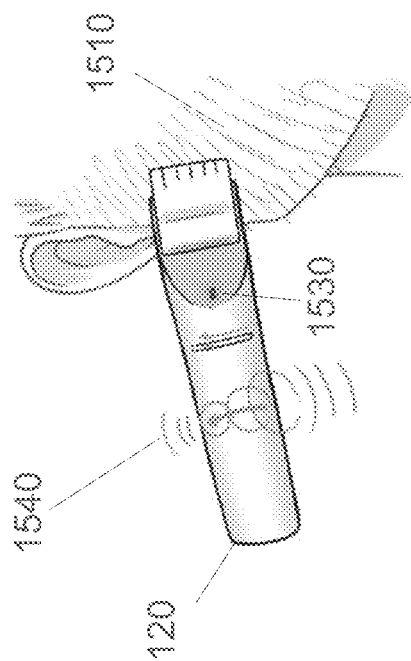
Figure 19A:
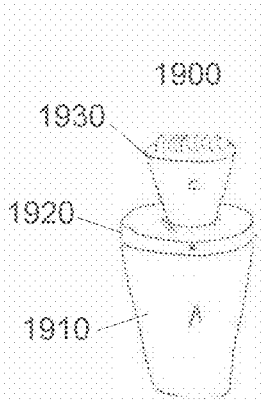
FIGS. 19A-D show examples of a self-correcting robotic razor device, according to some embodiments.
Figure 19B:
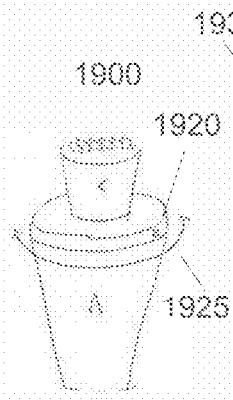
Figure 19C:
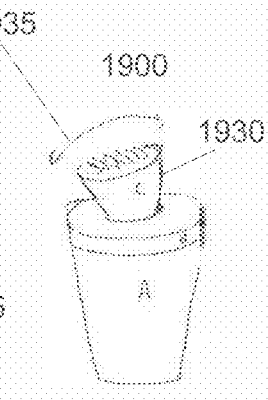
Figure 19D:
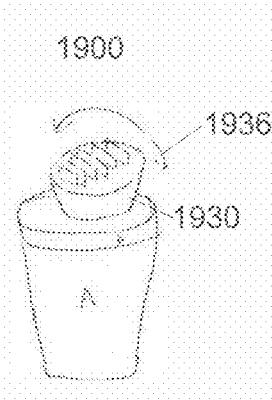

FIGS. 14A-C show an example of random movement of the smart razor 120 over a face, wireless communication 1420 between a smart mirror 110 (FIGS. 1-3 and 8-9B) and the smart razor 120, and achievement of a desired effect 1430, according to some embodiments. As a result of the wireless communication 1420, the user can move the smart razor 120 at random all over his face and still achieve the desired facial hair style. The smart mirror 110 in unison with the smart razor 120, determines where the smart razor 120 is with respect to the user's face and what the blade, comb or brush setting needs to be at that location, and switches to that immediately in real-time. The determination of where the clean-shaven line 1410 exists along the face determines when to limit the smart razor's 120 blade, comb or brush length.

In some embodiments, other than manually moving the smart razor 120, the user does not have to be actively involved in the process, thereby reducing the cognitive load of the user to a great extent allowing them to focus on other activities, such as watching TV on the smart mirror 110 while shaving. Also, because the calculations are performed by the computing system 113 (FIG. 1) and computing system 126 at a much faster rate than a human, the system 100 would allow finishing the shave at a much faster rate. It should be noted that in other embodiments, the smart razor 120 may be fixed using a stationary arm and holder, where the user simply moves their head instead of moving the smart razor 120. In yet another embodiment, a moveable robotic arm connected with the smart razor 120 may be used by the system 100 to move the robotic arm, which comes in handy for arm injuries, missing limbs, paralysis, etc.

FIGS. 15A-D show an example of advanced grooming using feedback communication on the smart razor 120, according to some embodiments. Advanced facial hairstyles are typically characterized by sharp borders with carefully crafted curves. To achieve that level of finish, it is important that a user holds the smart razor 120 not only at the right position, but also at the precise orientation, especially the rotation angle that will allow for these curves to be crafted. The system 100 (FIG. 1) computes this required angle, compares it with the current angle at which the user is holding the smart razor 120, calculates the offset and relays the information (e.g., from the smart mirror 110, from a smart phone, tablet or wearable electronic device, etc.) to the smart razor 120. The computing system 126 within the smart razor 120 receives this message, processes it and activates haptic feedback using the haptic module 122 on the smart razor 120. The haptic feedback starts to vibrate in a time phased manner and with different types of signals to provide feedback (e.g., at 1540) to the user about the direction and orientation in which they need to rotate the smart razor 120. The tactile feedback continues until the user reaches the desired orientation and position. Once the smart razor 120 is at the right angle, the vibration or buzzing stops and the smart razor 120 begins trimming with the setting appropriate to that location on the face 1510. The haptic feedback that creates a virtual force to provide information on the orientation and position is achieved by using multiple tactile actuators around the smart razor 120, and activates each of them in a time-phased manner, and also with signals resulted in a combination of shape (square, sinusoid, triangular), duty-cycle and power.

In some embodiment, the smart razor 120 is first activated (e.g., by a power switch, based on movement, based on a voice command, etc.) and moved in the direction 1520 or other direction to start the process. Besides the haptic feedback, in some embodiments an LED may illuminate a red color 1530 indicating the incorrect direction or angle of the blade, comb or brush of the smart razor 120. The haptic vibrations 1540 signal the user to rotate the smart razor 120 in the direction of the arrow 1525. Once the smart razor 120 is correctly positioned, the haptic vibration stops (shown as 1545) and the LED may illuminate a green color 1535.

FIG. 16 shows an example of graphical information 1640 provided by the smart mirror 110, according to some embodiments. In addition to the haptic feedback described above, in some embodiments visual feedback is also provided in two ways: via LED arrays 1630 on the smart razor 120, where the direction of time phased blinking LEDs informs the user the direction in which to rotate; and via the real-time visualization provided on the mirror reflection (e.g., graphical information 1640 that may include text, graphics of arrows, lines, etc.). The smart mirror 110 provides graphical user interfaces in the screen space. Additionally, graphical information 1640 is also super imposed on the regions corresponding to the smart razor 120, which is tracked via its 6DOF hardware. Paths traversed by the smart razor 120 may be important indicators of quality of finish.

In one embodiment, based on the tracking data provided by the tracking station 116 and the tracking module 127 and the "relative transformations" shown in FIGS. 6A-B, 9A and 9B, system 100 may calculate a 3-D position in space of the tip of the smart razor 120 and determine whether it is in contact with the face of the user. Proximity sensors of the smart razor 120 may also assist with this estimation. Taking the width of the smart razor 120 and its tolerance into account, the width that the smart razor 120 can cut at any given time can be estimated. For example, as the smart razor 120 moves along a flat surface along a straight line, the surface area of the rectangular region shaved can also be calculated by multiplying the width of the smart razor 120 and the distance covered. In this example embodiment, the scenario is more complicated since the user's face is a 3-D contour (non-flat) and the path traced by the smart razor 120 is not a straight line. Yet, the same principle can be extended by calculating the curve traced by the smart razor 120 along this 3-D surface and by integrating the width of the smart razor 120 along the arc to calculate the surface area covered.

In some embodiments, a temporary blank texture (referred to as session texture), which is the same size as the texture of a heat map (e.g., heat map 1140, FIG. 11) is created, which also maps on the reconstructed 3-D mask in the same way. When initialized, all of the session texture is marked with a high value—no surface area covered yet. As the shaving begins and the smart razor 120 starts to move, the surface area covered by the smart razor 120 is calculated and the corresponding texels of the temporary texture that map to those locations on the face that have been covered are marked with height used by the smart razor 120. At any point of time, the system 100 (FIG. 1) may compare this session texture with the heat map texture to calculate discrepancies—if a region that needs to be trimmed has never been visited. This in turn can help identify spots that the user might have missed and bring it to their attention.

FIG. 17 shows an example of textual and reflective information provided by the smart mirror 110, according to some embodiments. The system 100 (FIG. 1) provides for the user to randomly move the smart razor 120 all over the face, and yet get the desired look, irrespective of the path they took. By recording the path taken by the user and the area covered at each stroke (by the tracking station 116, the tracking module 128, and computing systems 116 and 126), the system 100 detects regions on the user's face that might have been missed. The system 100 may then use the visualization super imposed on the user's reflection to highlight these missed spots 1740 and enabling the user to correct them.

FIG. 18 shows an example of a template 1810 overlay mapped to a facial object (e.g., the user's face) provided by the smart mirror 110, according to some embodiments. In some embodiments, the user may select a template 1810 and superimpose the template 1810 on their reflection in the smart mirror 110 prior to moving forward with actually shaving. The smart mirror 110 may provide messaging 1840 indicating, in this example, that the user should maybe try the style shown in the template 1810. In some embodiments, the smart mirror 110 may suggest the template 1810 based on the shape of the user's face and comparing that shape to many different styles of templates that are suggested for the particular face shape. In other embodiments, the suggested template may arise from trending facial hair styles in social media, famous people, suggested by friends, etc.

In some embodiments, the smart mirror 110 may track the growth of a user's beard. Based on the amount of growth, the system 100 (FIG. 1) may inform (e.g., on the smart mirror 110, through voice, etc.) the user that the selected template will not work yet (e.g., current beard growth is insufficient), and an estimate of how long the user needs to wait. The system 100 may also recommend a comparable template based on the current beard growth of the user.

There are many paths that the user can take to achieve a desired look. Although the final output is satisfactory, some paths can result in a faster, cleaner finish than the others. This is especially important for advanced grooming scenarios. In some embodiments, the system 100 provides the option to guide the user along the most desirable path. The visualization super imposed on the user's facial reflection in the smart mirror 110 provides feedback on the optimal path the user needs to take in a step by step manner.

In some embodiments, based on visual capture of the user using the camera 115, the smart mirror 110 may recognize a disability of the user (e.g., wearing a caste, wearing a splint, missing an arm, etc.), and the system 100 may change the optimal shave path to one that is aligned the best for the user's special condition. In some embodiments, based on how the user holds the smart razor 120, the system 100 may determine whether the user is left-handed or right-handed (or prefers holding the smart razor 120 in one hand or the other), and selects the corresponding template that would be easiest to for the user to apply.

Achieving a look is complicated, but maintaining it over time is also an issue. In some embodiments, the system 100 can help maintain a look with little to no effort. Users can also modify a template to extend them to custom designs, record their shaving session and play them back at later times to repeat the same look.

The same technique can be used to repeat services from an external practitioner. When an expert, such as a barber, provides the user a custom look using the system 100, the system 100 can record the actions of the barber and save it to memory, a media disk, a cloud-based system, etc. At a later time, the user can replay the barber's recording, have the system 100 guide them through the same actions to repeat the same look. In some embodiments, a representative template may be generated based on a synchronized appearance for a group of people. In one example, the system 100 identifies common traits (e.g., face shape, growth rate, amount of growth, preferences, etc.) for building a template. The representative template may then be applied to the user so that the user obtains a facial look similar to the group.

In some embodiments, a specific template that represents a certain pattern (e.g., words, numbers, etc. on the head of athletes, entertainers, etc.) may be generated or obtained by the system 100.

In some embodiments, system 100 provides for runtime template adjustment. In one example, a user can use hands/ finger/etc. touching different parts of their face to indicate what the user would like to make certain changes to the template (e.g., dragging on a touchscreen, the mirror 110, etc.). In another example, the user may also use voice commands to achieve the template adjustment. In another embodiment, the smart mirror might have touch or hover input, which the user can use to make adjustments to the template by touching or hovering.

In some embodiments, the chosen templates largely define the style that is going to end up on the user's face. An online ecosystem may be created where users can browse and purchase advanced templates sold by expert barbers or facial style artists. Users may also hire an expert to design a custom look specifically suited for that user.

In some embodiments, the system 100 may learn the habits of the user. Details such as what aspects of generic templates users prefer to avoid and apply the same to the future, as well as other aspects such as speed and positioning. For example, when a user repeatedly skips the sharp sidelocks detailed in a template, the system 100 can learn that the user preference to skip it and adapt future sessions correspondingly; yet providing feedback to the user about this assumption in a progressive manner.

In some embodiments, the system 100 employing applicator device 500 may be used in face painting and make up scenarios. Instead of the smart razor 120 (FIGS. 1, 2, 4 and 12), the user would use the applicator device 500 described above, and use downloaded templates to paint their face into different effects, characters etc.

In an alternate embodiment, the system 100 may be used for creating tattoos using a tattoo applicator device. The camera 115 in the system 100 along with image processing algorithms or other kinds of body tracking technologies may be used to track the whole body of the user. A smart tattoo gun that contains similar components in the smart razor 110 or applicator device 500 can then be used to render advanced tattoos on the user's body.

FIGS. 19A-D show examples of a self-correcting robotic razor device 1900, according to some embodiments. In some embodiments, the components of the self-correcting robotic razor device 1900 are similar or the same as those of the smart razor 100 (FIG. 1). The razor head C 1930 automatically aligns itself to the surface of the user's face in the best angle possible, irrespective of how the user holds the self-correcting robotic razor device 1900. The self-correcting robotic razor device 1900 includes multiple mechanical components that enable 3-axis rotations (pitch, yaw, roll) between the razor head 1930 and the base A 1910 of the self-correcting robotic razor device 1900. In some embodiments, a user holds the self-correcting robotic razor device 1900 at base A 1910. A single axis rotation component B 1920 allows yaw rotation 1925. Razor head C 1930 is two-axis head, which allows pitch 1936 and roll 1935 simultaneous movement.

Figure 20A:
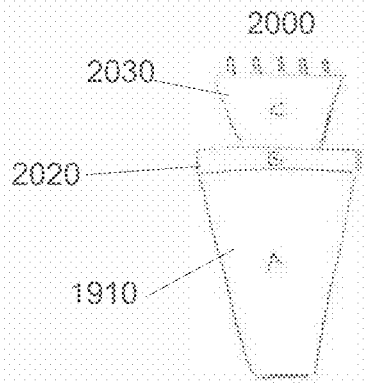
FIGS. 20A-C show examples of another self-correcting robotic razor device, according to some embodiments.
Figure 20B:
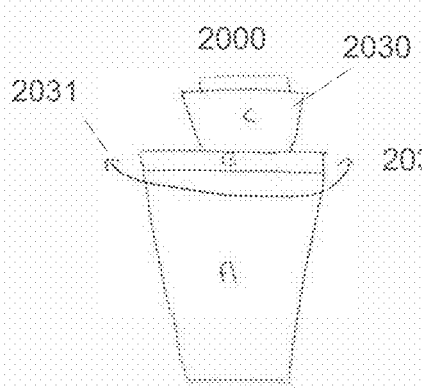
Figure 20C:
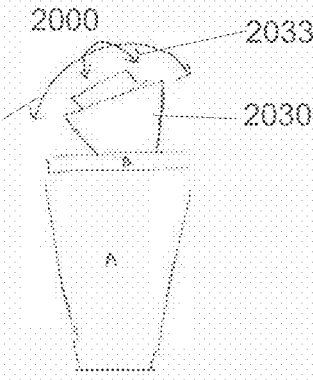

FIGS. 20A-C show examples of another self-correcting robotic razor device 2000, according to some embodiments. In some embodiments, the components of the self-correcting robotic razor device 2000 are similar or the same as those of the smart razor 100 (FIG. 1). The razor head C 2030 automatically aligns itself to the surface of the user's face in the best angle possible, irrespective of how the user holds the self-correcting robotic razor device 2000. The self-correcting robotic razor device 2000 includes multiple mechanical components that enable 3-axis rotations (pitch, yaw, roll) between the razor head 2030 and the base A 1910 of the self-correcting robotic razor device 2000. In some embodiments, a user holds the self-correcting robotic razor device 2000 at base A 1910. A single axis rotation component B 2020 allows yaw rotation 2031. Razor head C 2030 is two-axis head, which allows pitch 2033 and roll 2032 simultaneous movement between the razor head C 2030 and its blades.

In some embodiments, at any point of time, the system 100 (FIG. 1) can estimate the absolute position and orientation of the user's face by computer vision technology. Similarly, it has also been established that the base 1910 of the self-correcting robotic razor devices 1900 and 2000 may be tracked in 6DOF via several tracking mechanisms. The combination of the two allow the system 100 to calculate mismatch, and provide haptic feedback to nudge a user to adjust position and orientation to the correct posture, thereby reducing deviation.

In some embodiments, the robotic razor head C 1930/2030 may carry out some of the correction described above, such that the user does not have to (completely or at least partially depend on the angle). The system 100 knows that the ideal end position and orientation of the blades of the razor head C 1930/2030 for the best shave. When the user holds the self-correcting robotic razor device 1900/2000 in a not so optimal posture, the system 100 estimates the deviation and uses kinematics to calculate counter rotations/translations that the mechanical components of the self-correcting robotic razor device 1900/2000 should perform in order to reduce this deviation.

In some embodiments, when the user is holding the self-correcting robotic razor device 1900/2000 at an extremely odd posture that is not fully correctable by the robotic razor head C 1930/2030, it does as much as it can and then uses haptic feedback to nudge the user to make postural adjustment. This allows minimizing the adjustment the user has to perform. For example, if the user is off by 45 degrees and the robotic the razor head C 1930/2030 can correct by counter rotating 30 degrees, the user only has to rotate another 15 degrees (as compared to a full 45 degrees without the moveable robotic razor head C 1930/2030) to make the correction, which reduces work for the user.

In some embodiments, use of sensing technologies housed within the self-correcting robotic razor device 1900/2000 (position, rotation, pressure, etc.), the system 100 tracks and stores data that may be analyzed over time to provide useful information to the user. For example, when the user maintains a style referred to as a French beard, they are able to finish a shaving task for the day in a reduced amount of time (e.g., 5-10 minutes). Alternatively, when the user maintains a goatee style, which is more involved, the user may spend 17 minutes on an average per day in shaving. Information such as this can help busy professionals plan their lifestyle better by knowing the average actual time spent shaving with the self-correcting robotic razor device 1900/2000. In some embodiments, the time information described above may also be used to determine whether there is enough battery charge to complete the shaving operation desired. The system 100 may determine whether there is a need to charge the robotic razor device 1900/2000 (or smart razor 120, FIG. 1) or change to a template that requires less time to complete based on the amount of charge remaining in the robotic razor device 1900/2000 (or smart razor 120, FIG. 1).

In addition to the data from the self-correcting robotic razor device 1900/2000, the system 100 may also consolidate information from other connected devices in the users 'life', such as their smartwatch, digital scale, smart water bottle, weather information, traffic information, etc. In some embodiments, collected data may include, but is not limited to: heart rate, breathing rate, stress level, water consumption, sleep patterns, etc. This provides opportunity for cross correlation to observe patterns and interdependencies. For example, when the user runs outdoors every day during the summer and sleeps a full 8 hours, they may grow a beard faster when compared to just walking on a treadmill indoors every day and sleeping for 6 hours. This kind of correlation may provide insights that can let the user plan for or work around to meet their goals. Further, information regarding the current thickness, length and area of facial hair growth may be used to determine suitable templates for facial hair styles, time information (e.g., estimated time it will take for a user to grow their facial hair to an acceptable length, area, thickness) before a user may select certain templates for facial hair styles. This assists a user with potential selections. Additionally, the system 100 may take into consideration the user's style preferences, likes, trending styles, favorite actors, sports figures, friends, etc., facial hair styles to suggest to the user. The system 100 may also use information, such as weather forecast, to suggest more appropriate hair styles. Similarly, the system 100 may connect to the calendar application of the user to identify upcoming heavy physical activities such as camping trips, marathon race, etc., to suggest facial hair styles that can help with such pursuits. The system 100 may also use computer vision and data from other devices (e.g., smart phone, wearable device, tablet device, etc.) to estimate the current emotion of the user and adjust recommendations accordingly. The system 100 may also provide for quick shopping experiences such as identifying upcoming date of razor blades to run out of stock and display options for the user to reorder them quickly.

In some embodiments, the system 100 can cross-correlate the amount of attention a user receives (e.g., "likes" on photos, comments, etc.) to the facial hair style they maintained at a given time to provide insight such as what style do people most respond to, and rank them. The user can then correspondingly use this information at some point or time to their benefit.

Figure 21A:
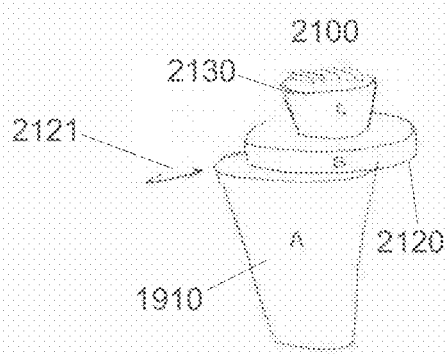
FIGS. 21A-C show examples of yet another self-correcting robotic razor device, according to some embodiments.
Figure 21B:
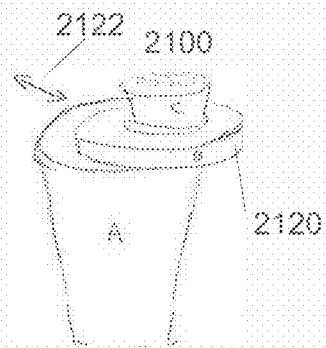
Figure 21C:
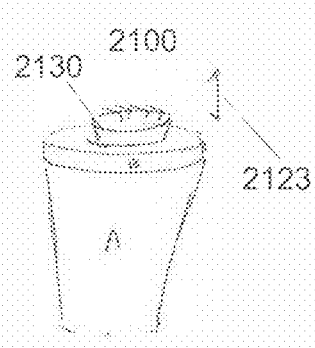

FIGS. 21A-C show examples of yet another self-correcting robotic razor device 2100, according to some embodiments. The self-correcting robotic razor device 2100 adds translation to the previously described embodiments. Translation device B 2120 can shift in the x 2121 and y 2122 direction, and the moveable robotic razor head C 2130 can shift in the z 2123 direction.

Figure 22:
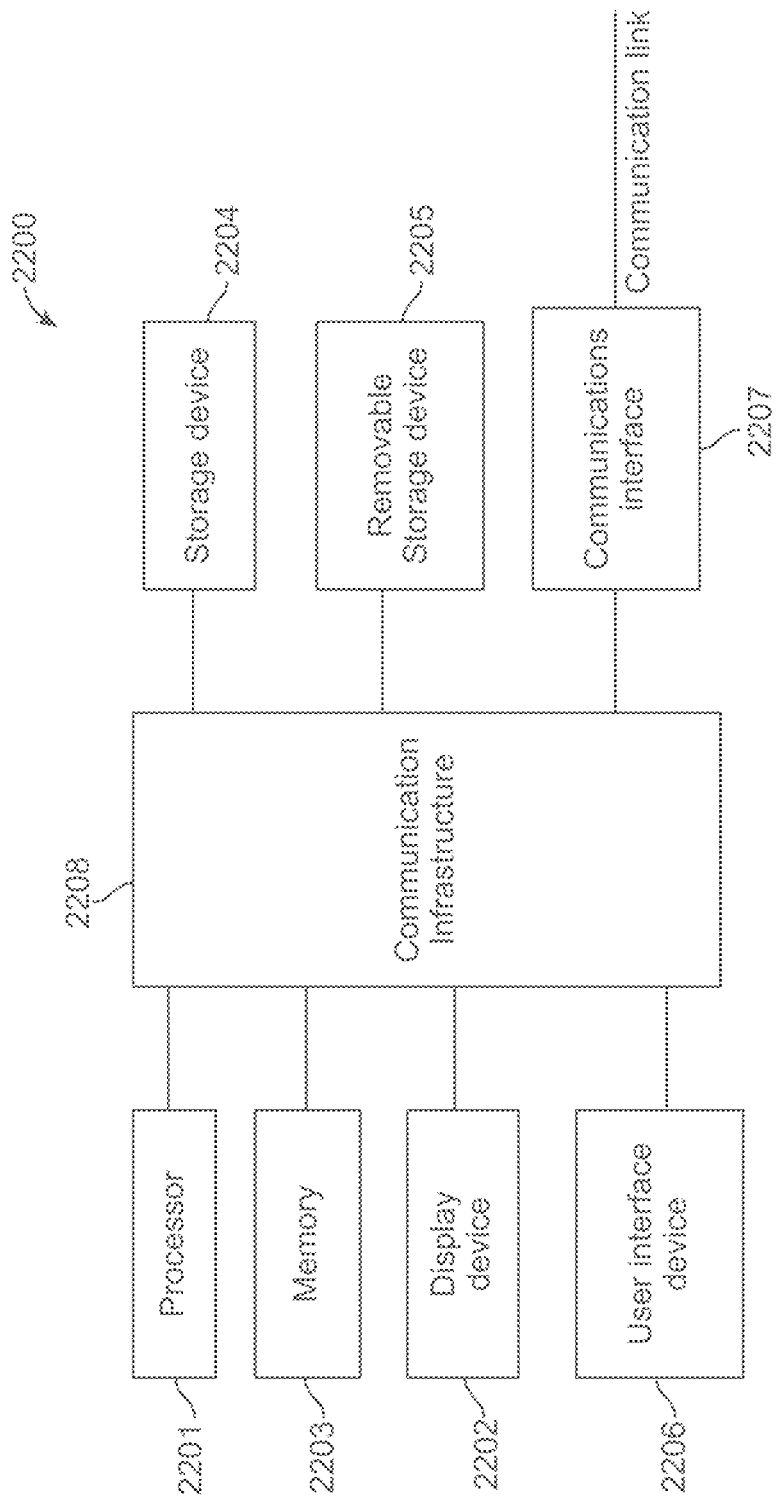
FIG. 22 is an exemplary high-level block diagram showing an information processing system comprising a computer system useful for implementing disclosed embodiments.

FIG. 22 is an exemplary high-level block diagram showing an information processing system comprising a computer system 2200 useful for implementing disclosed embodiments. Computer system 2200 may be incorporated in system 100 (FIG. 1) in the smart mirror 110, the smart razor 120, self-correcting robotic razor devices 1900, 2000 and 2100. The computer system 2200 includes one or more processors 2201, and can further include an electronic display device 2202 (for displaying video, graphics, text, and other data), a main memory 2203 (e.g., random access memory (RAM)), storage device 2204 (e.g., hard disk drive), removable storage device 2205 (e.g., removable storage drive, removable memory device, a magnetic tape drive, optical disk drive, computer readable medium having stored therein computer software and/or data), user interface device 2206 (e.g., keyboard, touch screen, capacitive surface touch elements, etc.), and a communication interface 2207 (e.g., modem, a network interface (such as an Ethernet card), a communications port, or a PCMCIA slot and card). The communication interface 2207 allows software and data to be transferred between the computer system and external devices. The system 2200 further includes a communications infrastructure 2208 (e.g., a communications bus, crossover bar, or network) to which the aforementioned devices/processors 2201 through 2207 are connected.

In one embodiment, the main memory 2203, storage device 2204 and removable storage device 2205, each by themselves or in any combination, may store instructions for the embodiments described above that may be executed by the one or more processors 2201.

Information transferred via communications interface 2207 may be in the form of signals such as electronic, electromagnetic, optical, or other signals capable of being received by communications interface 2207, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In some embodiments, processing instructions for system 100 may be stored as program instructions on the memory 2203, storage device 2204 and the removable storage device 2205 for execution by the processor 2201.

FIG. 23 shows a block diagram for a process 2300 for object modification using mixed reality, according to some embodiments. In block 2310, receiving first information (e.g., position, orientation, facial hair information, etc.), by a first electronic device (e.g., smart mirror 110, FIG. 1, a smart phone, computing tablet, smart camera, wearable computing device, etc.), for a superimposed heat map that is mapped to a three-dimensional mask for an object (e.g., a user's face). In block 2320, second information (e.g., pressure information, proximity information, capacitive touch information, etc.) is received for detection of contact of a second electronic device (e.g., smart razor 120, applicator device 500, a smart tattoo gun, etc.) with the object. In block 2330, communication (e.g., signals, feedback, messaging, etc.) is provided to the second electronic device based on determining position of the second electronic device in relation to the object and the superimposed heat map.

In some embodiments, process 2300 may further include providing the communication to a position and orientation tracking unit (e.g., tracking station 116) for tracking six degrees of freedom (6DOF) positions and orientations of the second electronic device. The communication may then cause haptic indications, visual indications, sound or a combination thereof (either on the first electronic device, the second electronic device, or a combination thereof).

In some embodiments, process 2300 may further include receiving communications, in real-time, from the second electronic device for object information comprising: tracked 6DOF positions and orientations. The first electronic device may operate in at least one state with mirroring functionality for reflecting the visual indications.

Process 2300 may additionally include receiving, by the first electronic device, a template selection (for various facial hair styles, face painting styles, etc.), to control the second electronic device based on a selected template. The heat map may be superimposed upon a reflected image of the object to identify a difference between the selected template and the reflected image of the object.

In some embodiments, process 2300 may include sending the communication to the second electronic device to cause the second electronic device to estimate tracking deviations and use kinematics to determine counter movements for an actuator and motor of the second electronic device to reduce the deviations. Based on features of the object, the three-dimensional mask of the object may be built to map the selected template to the object and features of the object.

In some embodiments, the process 2300 may include tracking the features of the object using an image capturing device (e.g., camera 115). An operation path for the second electronic device is provided in process 2300 to reach a desired effect using the selected template. The difference may be displayed by the first device based on the tracked features.

In some embodiments, process 2300 may include stopping the communication when the second electronic device rotates to a desired orientation and position based on the selected template. The first electronic device may cause a robotic element of the second electronic device (e.g., rotation component B 1920 and/or razor head C 1930 (FIGS. 19A-D), rotation component B 2020 and/or razor head C 2030 (FIGS. 20A-C), translation device B 2120 and/or robotic razor head C 2130 (FIGS. 21A-C)), to adjust position and orientation based on relative position of the object and the heat map. In process 2300, the features of the object comprise facial information. Consolidated information from other devices (e.g., smartwatch, digital scale, smart water bottle, weather information, traffic information, etc.) connected with the first electronic device provide collected health related information (e.g., heart rate, breathing rate, stress level, water consumption, food consumption, exercise information, sleep patterns, etc.) for cross correlation to observe patterns and interdependencies for planning template selection and receiving communication for template selection. Template information is shareable across social media (platforms). The selected template is modifiable for storing as a new template. The robotic element may be: a single color or multiple color ink deploying device (e.g., applicator device 500), or a trimmer device coupled to a comb device that is controlled by the actuator.

Figure 24:
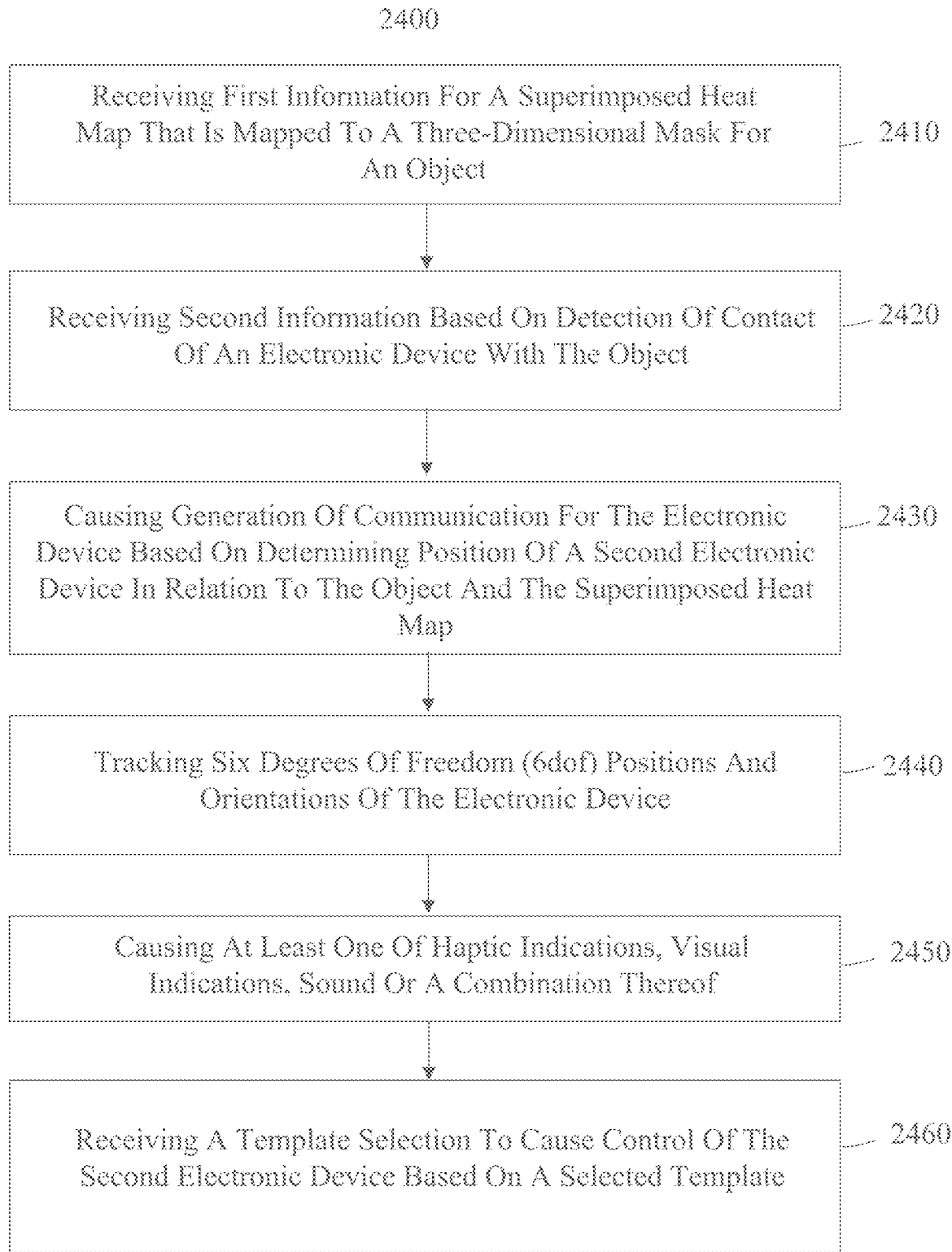
FIG. 24 shows a block diagram for a process for object modification using communications, according to some embodiments.

FIG. 24 shows a block diagram for a process 2400 for object modification using communications, according to some embodiments. In block 2410, first information (e.g., information 424, FIG. 4) is received (e.g., from a server, a cloud computing environment, a file, a smart electronic device, etc.), for a superimposed heat map (e.g., a heat map 1140, FIG. 11) that is mapped to a three-dimensional mask for an object (e.g., a person's face, a facial hair practice mannequin, etc.). In block 2420, second information (e.g., when contact of a smart razor 120 (FIG. 1) with a surface of an object occurs based on one or more of a contact sensor, a proximity sensor, a pressure sensor, etc.) is received (e.g., from contact module 128, FIG. 1) based on detection of contact of an electronic device (e.g., a smart razor 120, an applicator 500, etc.) with the object. In block 2430 generation of communication for the electronic device is caused based on determining position of the second electronic device in relation to the object and the superimposed heat map. In block 2440 6DOF positions and orientations of the electronic device are tracked (e.g., using the tracking station 116 (FIG. 1), tracking module 127, or a combination thereof). In block 2450 at least one of haptic indications, visual indications, sound or a combination thereof are caused (e.g., via a server, a smart mirror 110 (FIG. 1), an electronic device, etc.). In block 2460, a template (e.g., for facial hair style, for object painting, for tattoo style, etc.) selection is received to cause control of a second electronic device (e.g., a smart mirror 110 (FIG. 1) based on a selected template.

In some embodiments, process 2400 may further include estimating tracking deviations (e.g., from a tracking station 116 (FIG. 1) and using kinematics to cause counter movements for an actuator and motor of the electronic device to reduce the deviations. Based on features of the object, the three-dimensional mask of the object is built to map the selected template to the object and features of the object (e.g., by a computing system 113 (FIG. 1).

In some embodiments, process 2400 may further include providing an operation path for the electronic device to reach a desired effect using the selected template. Display of the difference may be caused based on the tracked features. A robotic element of the electronic device (e.g., smart razor 1900 (FIGS. 19A-D), 2000 (FIGS. 20A-C), 2100 (FIGS. 21A-C), etc.) may be caused to adjust position and orientation based on relative position of the object and the heat map.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software processor/process or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "processor" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a process, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiments that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A smart mirror device comprising:
a memory that stores instructions; and
a processor that executes the instructions to:
receive first information associated with a superimposed heat map that is mapped to a three-dimensional mask for an object, wherein the heat map uses variable information to provide visual indications of different features of the object, the visual indications indicating at least one trimming setting in each region where an electronic device is directed to operate on the object, and the at least one trimming setting in each region is sent to the electronic device through wireless communication and controls the electronic device by adjustment of a height setting on the electronic device made based on the wireless communication;

receive second information for detection of contact of the electronic device with the object; and provide a first communication to the electronic device based on determining position of the electronic device in relation to the object and the superimposed heat map.

2. The smart mirror device of claim 1, further comprising:
a mirror overlayed on a display panel;
wherein:
the first communication is provided to a position and orientation tracking unit for tracking six degrees of freedom (6DOF) positions and orientations of the electronic device;
the first communication causes at least one of haptic indications, visual indications, sound or a combination thereof; and
the height setting is adjusted by modifying height of at least one of a blade, a comb or a brush on the electronic device.

3. The smart mirror device of claim 2, wherein:
the processor further executes the instructions to receive communications, in real-time, from the electronic device for object information comprising: tracked 6DOF positions and orientations; and
the smart mirror device operates in at least one state with mirroring functionality for reflecting the visual indications.

4. The smart mirror device of claim 3, wherein:
the processor further executes the instructions to: receive a template selection, control the electronic device based on a selected template, and superimpose the heat map upon a reflected image of the object for identifying a difference between the selected template and the reflected image of the object.

5. The smart mirror device of claim 4, wherein:
the first communication causes the electronic device to estimate tracking deviations and use kinematics to determine counter movements for an actuator and motor of the electronic device to reduce the deviations; and
the processor further executes the instructions to use features of the object to build the three-dimensional mask of the object to map the selected template to the object and features of the object.

6. The smart mirror device of claim 5, wherein:
the smart mirror device is coupled to an image capturing device for tracking the features of the object; and
the processor further executes the instructions to provide an operation path for the electronic device to reach a desired effect using the selected template, and display the difference by the smart mirror device based on the tracked features.

7. The smart mirror device of claim 4, wherein:
the first communication stops when the electronic device rotates to a desired orientation and position based on the selected template; and
the smart mirror device causes a robotic element of the electronic device to adjust position and orientation based on relative position of the object and the heat map.

8. The smart mirror device of claim 7, wherein the robotic element comprises one of: a single color or multiple color ink deploying device, or a trimmer device coupled to a comb device that is controlled by the actuator.

9. The smart mirror device of claim 4, wherein:
template information is shareable across social media; and
the selected template is modifiable for storing as a new template.

10. The smart mirror device of claim 1, wherein:
the variable information comprises at least one of: color information or shading information;
the visual indications comprise color and shading;
the features of the object comprise facial information; and
consolidated information from other devices connected with the smart mirror device provide collected health related information for cross correlation to observe patterns and interdependencies for planning template selection and receiving communications for template selection.

11. A method comprising:
receiving first information, by a first electronic device, for a superimposed heat map that is mapped to a three-dimensional mask for an object, wherein the heat map uses variable information to provide visual indications of different features of the object, the visual indications indicating at least one trimming setting in each region where a second electronic device is directed to operate on the object, and the at least one trimming setting in each region is sent to the second electronic device through wireless communication and controls the second electronic device by adjustment of a height setting on the second electronic device made based on the wireless communication;
receiving second information for detection of contact of the second electronic device with the object; and
providing a first communication to the second electronic device based on determining position of the second electronic device in relation to the object and the superimposed heat map.

12. The method of claim 11, further comprising:
providing the first communication to a position and orientation tracking unit for tracking six degrees of freedom (6DOF) positions and orientations of the second electronic device; and
causing, by the first communication, at least one of haptic indications, visual indications, sound or a combination thereof;
wherein the variable information comprises at least one of: color information or shading information, the visual indications comprise color and shading, and the height setting is adjusted by modifying height of at least one of a blade, a comb or a brush on the second electronic device.

13. The method of claim 12, further comprising:
receiving communications, in real-time, from the second electronic device for object information comprising: tracked 6DOF positions and orientations; and
operating, by the first electronic device, in at least one state with mirroring functionality for reflecting the visual indications.

14. The method of claim 13, further comprising:
receiving, by the first electronic device, a template selection, to control the second electronic device based on a selected template; and
superimposing the heat map upon a reflected image of the object to identify a difference between the selected template and the reflected image of the object.

15. The method of claim 14, further comprising:
sending the first communication to the second electronic device to cause the second electronic device to estimate tracking deviations and use kinematics to determine counter movements for an actuator and motor of the second electronic device to reduce the deviations; and
building, based on features of the object, the three-dimensional mask of the object to map the selected template to the object and features of the object.

16. The method of claim 15, further comprising:
tracking the features of the object using an image capturing device;
providing an operation path for the second electronic device to reach a desired effect using the selected template; and
displaying the difference by the first device based on the tracked features.

17. The method of claim 14, further comprising:
stopping the first communication when the second electronic device rotates to a desired orientation and position based on the selected template; and
causing, by the first electronic device, a robotic element of the second electronic device to adjust position and orientation based on relative position of the object and the heat map;
wherein:
the features of the object comprise facial information;
consolidated information from other devices connected with the first electronic device provide collected health related information for cross correlation to observe patterns and interdependencies for planning template selection and receiving communications for template selection;
template information is shareable across social media;
the selected template is modifiable for storing as a new template; and
the robotic element comprises one of: a single color or multiple color ink deploying device, or a trimmer device coupled to a comb device that is controlled by the actuator.

18. A non-transitory processor-readable medium that includes a program that when executed by a processor performs a method comprising:
receiving first information for a superimposed heat map that is mapped to a three-dimensional mask for an object, wherein the heat map uses variable information to provide visual indications of different features of the object, the visual indications indicating at least one trimming setting in each region where an electronic device is directed to operate on the object, and the at least one trimming setting in each region is sent to the electronic device through wireless communication and controls the electronic device by adjustment of a height setting on the electronic device made based on the wireless communication;
receiving second information based on detection of contact of the electronic device with the object; and
causing generation of a first communication for the electronic device based on determining position of a second electronic device in relation to the object and the superimposed heat map.

19. The non-transitory processor-readable medium of claim 18, wherein:
the variable information comprises at least one of: color information or shading information, and the visual indications comprise color and shading;
the height setting is adjusted by modifying height of at least one of a blade, a comb or a brush on the electronic device; and
the method further comprises:
tracking six degrees of freedom (6DOF) positions and orientations of the electronic device;
causing at least one of haptic indications, visual indications, sound or a combination thereof;
receiving a template selection to cause control of the second electronic device based on a selected template;
estimating tracking deviations and using kinematics to cause counter movements for an actuator and motor of the electronic device to reduce the deviations; and
building, based on features of the object, the three-dimensional mask of the object to map the selected template to the object and features of the object.

20. The non-transitory processor-readable medium of claim 19, wherein the method further comprises:
providing an operation path for the electronic device to reach a desired effect using the selected template;
causing display of the difference based on the tracked features; and
causing a robotic element of the electronic device to adjust position and orientation based on relative position of the object and the heat map;
wherein:
the features of the object comprise facial information;
collecting health related information for cross correlation to observe patterns and interdependencies for planning template selection and receiving communications for template selection;
template information is shareable across social media;
the selected template is modifiable for storing as a new template; and
the robotic element comprises one of: a single color or multiple color ink deploying device, or a trimmer device coupled to a comb device that is controlled by the actuator.

* * * * *